United States Patent
Kaiso et al.

(10) Patent No.: US 10,648,159 B2
(45) Date of Patent: May 12, 2020

(54) OBSTACLE MONITORING SYSTEM, CONSTRUCTION MACHINE, AND OBSTACLE MONITORING METHOD

(71) Applicant: KOBELCO CONSTRUCTION MACHINERY CO., LTD., Hiroshima-shi (JP)

(72) Inventors: Shuhei Kaiso, Hiroshima (JP); Hajime Nakashima, Hiroshima (JP)

(73) Assignee: KOBELCO CONSTRUCTION MACHINERY CO., LTD., Hiroshima-shi (JP)

(*) Notice: Subject to any disclaimer, the term of this patent is extended or adjusted under 35 U.S.C. 154(b) by 262 days.

(21) Appl. No.: 15/905,333

(22) Filed: Feb. 26, 2018

(65) Prior Publication Data
US 2018/0245315 A1    Aug. 30, 2018

(30) Foreign Application Priority Data
Feb. 28, 2017   (JP) ................... 2017-036271

(51) Int. Cl.
  *E02F 9/26*  (2006.01)
  *E02F 9/24*  (2006.01)
  *G06T 7/70*  (2017.01)
  *E02F 3/32*  (2006.01)

(52) U.S. Cl.
  CPC ............... *E02F 9/26* (2013.01); *E02F 3/32* (2013.01); *E02F 9/24* (2013.01); *E02F 9/261* (2013.01); *G06T 7/70* (2017.01); *G06T 2207/30261* (2013.01)

(58) Field of Classification Search
CPC combination set(s) only.
See application file for complete search history.

(56) References Cited

U.S. PATENT DOCUMENTS

| | | | |
|---|---|---|---|
| 2005/0024191 A1* | 2/2005 | Boddy | B60Q 1/305 340/435 |
| 2006/0012467 A1* | 1/2006 | Kade | B60T 7/22 340/435 |
| 2013/0088593 A1 | 4/2013 | Ishimoto | |
| 2014/0354813 A1 | 12/2014 | Ishimoto | |

(Continued)

FOREIGN PATENT DOCUMENTS

| EP | 2 570 556 A1 | 3/2013 |
|---|---|---|
| EP | 2 757 782 A1 | 7/2014 |

(Continued)

OTHER PUBLICATIONS

Extended European Search Report dated Jul. 24, 2018 in Patent Application No. 18158316.2, 5 pages.

*Primary Examiner* — Travis R Hunnings
(74) *Attorney, Agent, or Firm* — Oblon, McClelland, Maier & Neustadt, L.L.P.

(57) ABSTRACT

A monitoring region for monitoring entry of an obstacle is set around a machine main body. A plurality of obstacle sensing sensors sense an obstacle in the monitoring region and sense an obstacle in different directions with respect to the machine main body. A construction machine accumulatively stores approach information indicating that an obstacle has been sensed by any of the plurality of obstacle sensing sensors in a specific period, and outputs the approach information to be displayed on a display device.

14 Claims, 13 Drawing Sheets

(56) References Cited

U.S. PATENT DOCUMENTS

| | | | | |
|---|---|---|---|---|
| 2015/0287324 A1* | 10/2015 | Schwindt | ............. | B60W 50/14 |
| | | | | 340/435 |
| 2015/0343976 A1* | 12/2015 | Lim | ..................... | G01S 15/931 |
| | | | | 340/435 |
| 2018/0044893 A1* | 2/2018 | Machida | ................ | H04N 5/272 |
| 2018/0245315 A1* | 8/2018 | Kaiso | .................... | E02F 9/24 |
| 2018/0274206 A1* | 9/2018 | Kozui | ................... | E02F 9/123 |
| 2018/0347150 A1* | 12/2018 | Moriki | ..................... | E02F 3/32 |
| 2019/0028676 A1* | 1/2019 | Koga | .................... | G06Q 10/06 |

FOREIGN PATENT DOCUMENTS

| | | |
|---|---|---|
| JP | 2005-275723 | 10/2005 |
| JP | 2012-172350 A | 9/2012 |

\* cited by examiner

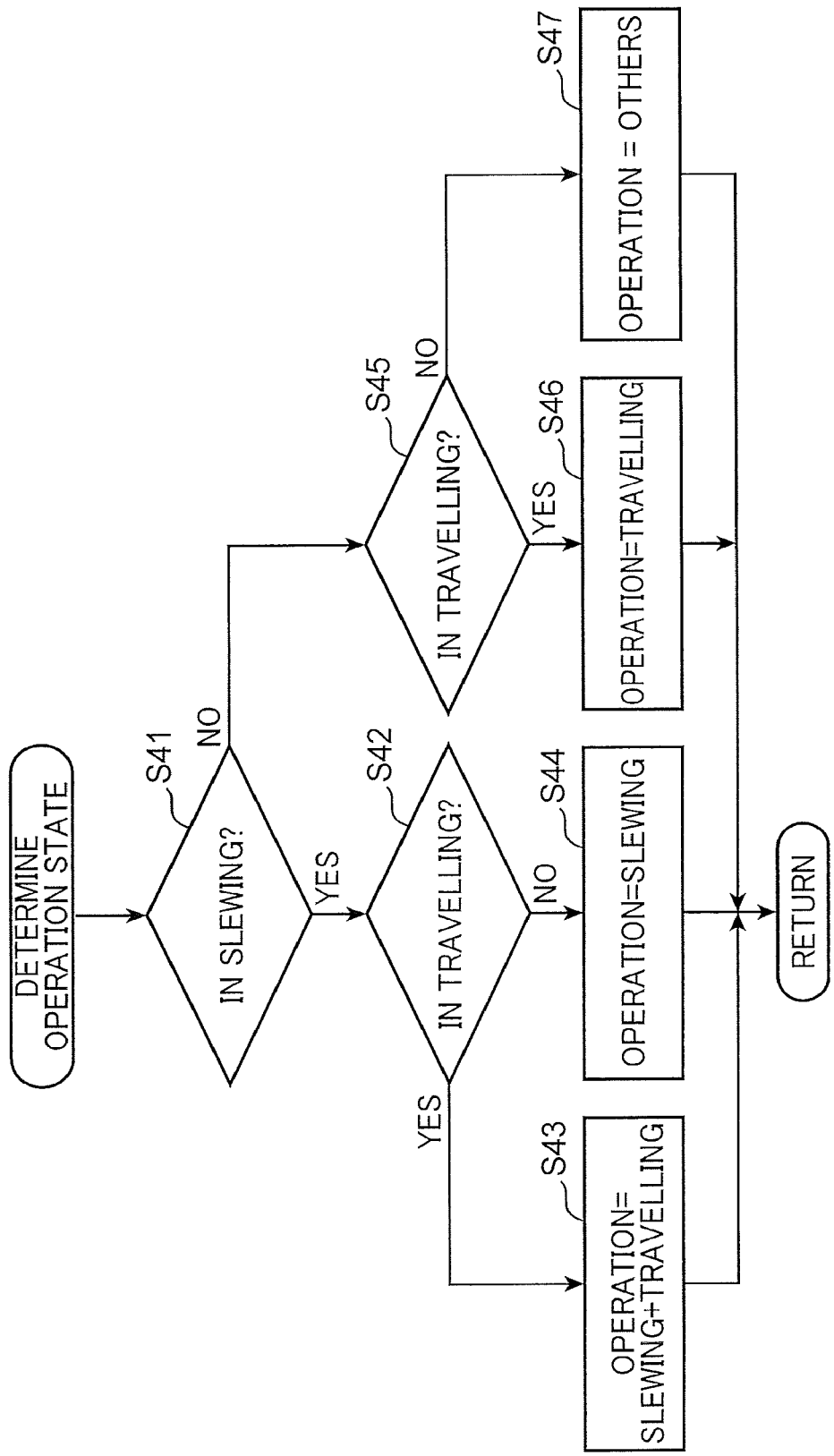

FIG. 9

| OCCURRENCE TIME (YEAR/MONTH/ DAY/HOUR/ MINUTE/SECOND) | IDENTIFICATION NUMBER | OPERATION STATE (SLEWING, TRAVELLING, SLEWING+ TRAVELLING, OTHERS) | REGION (DECELERATION REGION, STOP REGION) | SENSOR REACTION DIRECTION (LEFT, RIGHT, REAR) | OCCURRENCE POSITION (LATITUDE, LONGITUDE) |
|---|---|---|---|---|---|
| 2017/2/6 13:00 | N151 | SLEWING | DECELERATE | LEFT | +36.19090,+136.27415' |
| 2017/2/6 14:00 | N151 | SLEWING | DECELERATE | LEFT | +36.19090,+136.27416' |
| 2017/2/6 14:30 | N151 | OTHERS | DECELERATE | LEFT | +36.19090,+136.27417' |
| 2017/2/6 14:50 | N151 | TRAVELLING | STOP | REAR | +36.19090,+136.27418' |
| 2017/2/6 15:00 | N151 | SLEWING | STOP | RIGHT | +36.19090,+136.27419' |
| ..... | ..... | ..... | ..... | ..... | ..... |

| OCCURRENCE TIME (YEAR/MONTH/ DAY/HOUR/ MINUTE/SECOND) | IDENTIFICATION NUMBER | OPERATION STATE (SLEWING, TRAVELLING, SLEWING+ TRAVELLING, OTHERS) | REGION (DECELERATION REGION, STOP REGION) | SENSOR REACTION DIRECTION (LEFT, RIGHT, REAR) | OCCURRENCE POSITION (LATITUDE, LONGITUDE) |
|---|---|---|---|---|---|
| 2017/2/6 13:00 | N151 | SLEWING | DECELERATE | LEFT | +36.19090,+136.27415' |
| 2017/2/6 14:00 | N151 | SLEWING | DECELERATE | LEFT | +36.19090,+136.27416' |
| 2017/2/6 14:30 | N151 | OTHERS | DECELERATE | LEFT | +36.19090,+136.27417' |
| 2017/2/6 14:50 | N151 | TRAVELLING | STOP | REAR | +36.19090,+136.27418' |
| 2017/2/6 15:00 | N151 | SLEWING | STOP | RIGHT | +36.19090,+136.27419' |
| ... | ... | ... | ... | ... | ... |
| 2017/2/6  9:00 | N152 | TRAVELLING | STOP | REAR | +36.20000,+136.27500' |
| ... | ... | ... | ... | ... | ... |
| 2017/2/6 10:00 | N153 | SLEWING | DECELERATE | RIGHT | +36.21000,+136.27600' |
| ... | ... | ... | ... | ... | ... |

TB2

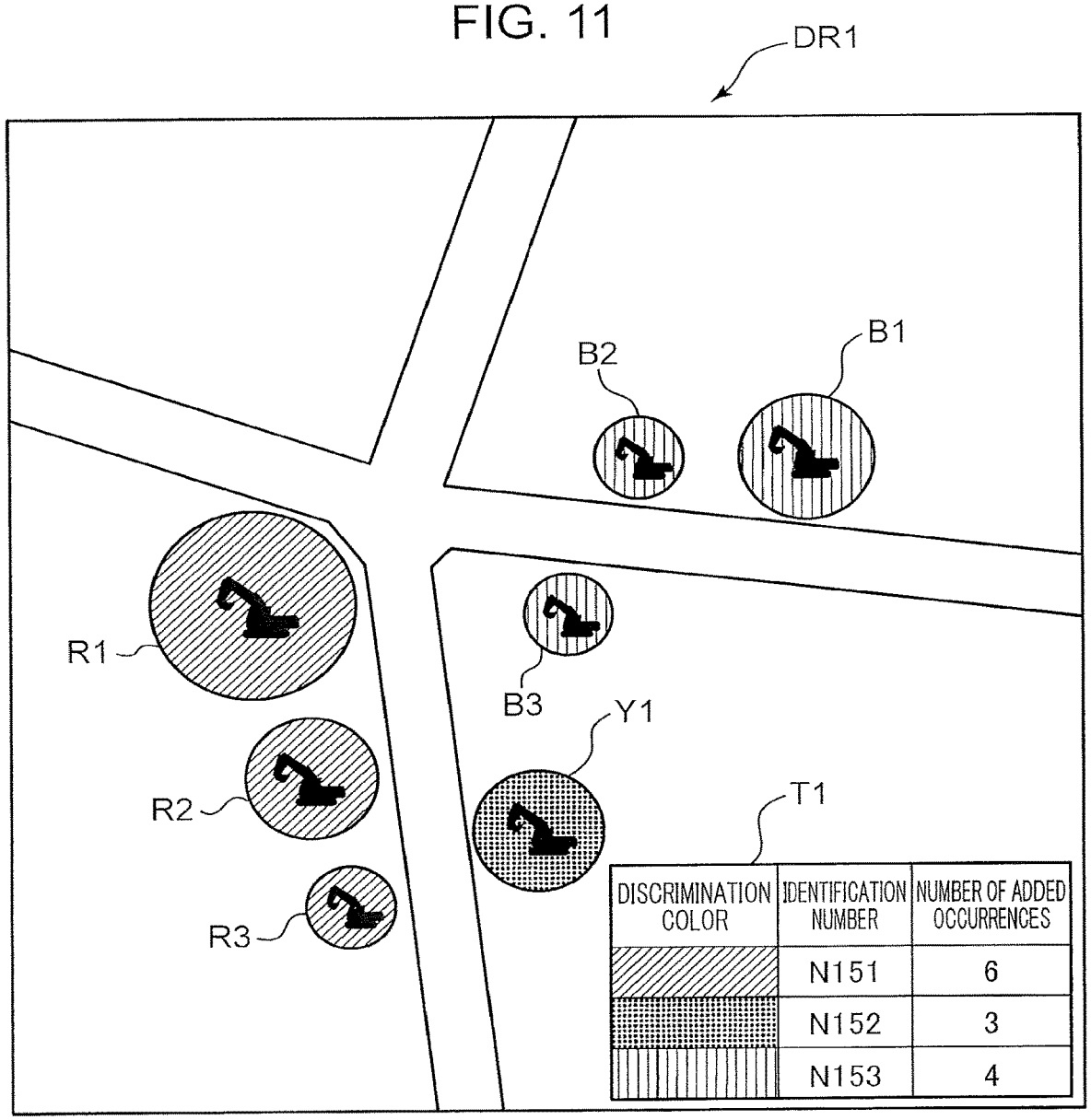

OBSTACLE MONITORING SYSTEM, CONSTRUCTION MACHINE, AND OBSTACLE MONITORING METHOD

TECHNICAL FIELD

The present invention relates to an obstacle monitoring system which obtains information about an obstacle approaching the surroundings of a machine, to a construction machine, and to an obstacle monitoring method.

BACKGROUND ART

There has been conventionally proposed a monitoring movable body (e.g. JP2005-275723A) equipped with a foreign matter sensing sensor which senses an obstacle on a road surface, and the like and capable of detecting position information of a foreign matter in order to manage road safety. Specifically, the monitoring movable body includes a positioning device which outputs travelling position information of a movable body, a foreign matter sensing sensor which monitors a foreign matter on a road surface to obtain foreign matter sensing information, and a foreign matter position computing device which detects foreign matter position information from the travelling position information and the foreign matter sensing information.

In JP2005-275723A, a foreign matter on a runway surface is detected by a foreign matter sensing sensor. By contrast, a construction machine may approach various structures by slewing or travelling or a worker may work in proximity to the construction machine. In such a case, if it is possible to sense various structures or a worker approaching closer and check approach information by those concerned such as a site supervisor and the like, a condition at that time can be confirmed with an operator based on the information, or the like to serve for safety of subsequent work.

SUMMARY OF INVENTION

Under these circumstances, the present invention aims at providing an obstacle monitoring system or the like which is capable of displaying, on a display device, approach information indicating that an obstacle has been sensed around a construction machine.

An obstacle monitoring system according to one aspect of the present invention is an obstacle monitoring system including:
one or a plurality of construction machines;
a server; and
an information processing device,
the construction machines, the server, and the information processing device being connected via a network, in which
each of the construction machines includes:
a machine main body;
a monitoring region setting unit which sets a monitoring region around the machine main body, the monitoring region being for monitoring entry of an obstacle;
a plurality of obstacle sensing sensors arranged in the machine main body for sensing an obstacle entering the monitoring region from different directions;
a storage unit;
a storage processing unit which generates, when the obstacle has been sensed by at least one of the plurality of obstacle sensing sensors in a specific period, approach information indicating that the obstacle has been sensed to cause the storage unit to accumulatively store the approach information; and
an output processing unit which outputs the approach information accumulatively stored in the storage unit in the specific period,
wherein the server includes a log data storage unit which stores the approach information output from each of the construction machines; and
wherein the information processing device includes:
a communication unit which obtains the approach information from the server; and
a control unit which displays the obtained approach information on a display.

The above-described configuration enables approach information to be displayed on a display, the approach information indicating that an obstacle has been sensed around a construction machine. Therefore, the present invention allows those concerned to check displayed approach information, thereby presenting information useful for safety of subsequent work.

BRIEF DESCRIPTION OF DRAWINGS

FIG. 8 is a flow chart showing operation state determination processing;

FIG. 9 is a diagram showing one example of a log data table stored and output by the hydraulic excavator;

FIG. 10 is a diagram showing one example of a log data table stored by a server;

FIG. 11 is a view showing one example of an overall daily report;

DESCRIPTION OF EMBODIMENTS

Figure 1:
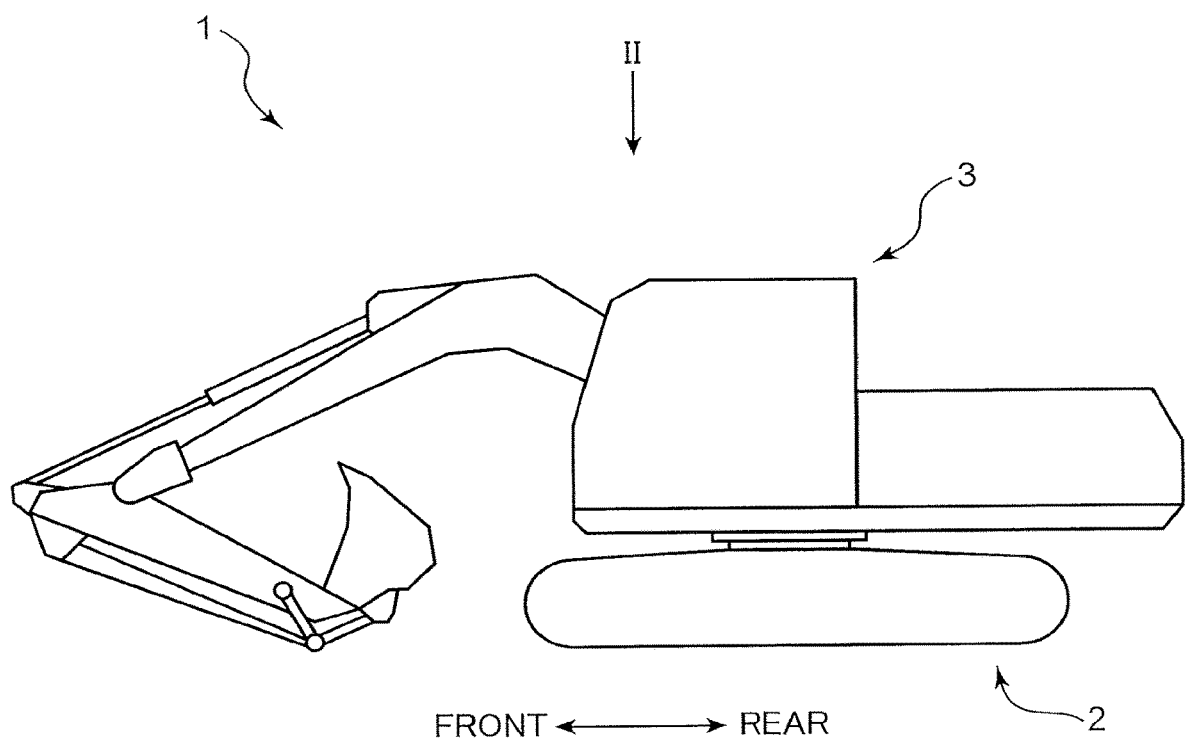
FIG. 1 is a side view showing a hydraulic excavator according to an embodiment of the present invention.

An obstacle monitoring system according to one embodiment of the present invention will be described based on FIG. 1 to FIG. 12. In the following, as one example of a construction machine constituting the obstacle monitoring system, a hydraulic excavator 1 shown in FIG. 1 is exemplified. For the sake of explanation, a front-rear direction and a right and left direction of the hydraulic excavator 1 are defined as shown in FIG. 1 and FIG. 2.

FIG. 1 is a side view showing the hydraulic excavator 1 according to the embodiment of the present invention. FIG. 2 is a view seen from a direction II in FIG. 1. Note that "seen from the direction II" represents a direction of the hydraulic excavator 1 from an upper side to a lower side.

As shown in FIG. 1, the hydraulic excavator 1 includes a crawler type lower travelling body 2 and an upper slewing body 3. The upper slewing body 3 is mounted on the lower travelling body 2. The upper slewing body 3 is mounted slewably around a vertical axis with respect to the lower travelling body 2. The upper slewing body 3 and the lower travelling body 2 form one example of a machine main body according to the present invention. The lower travelling body 2 includes a pair of right and left crawlers.

Figure 2:
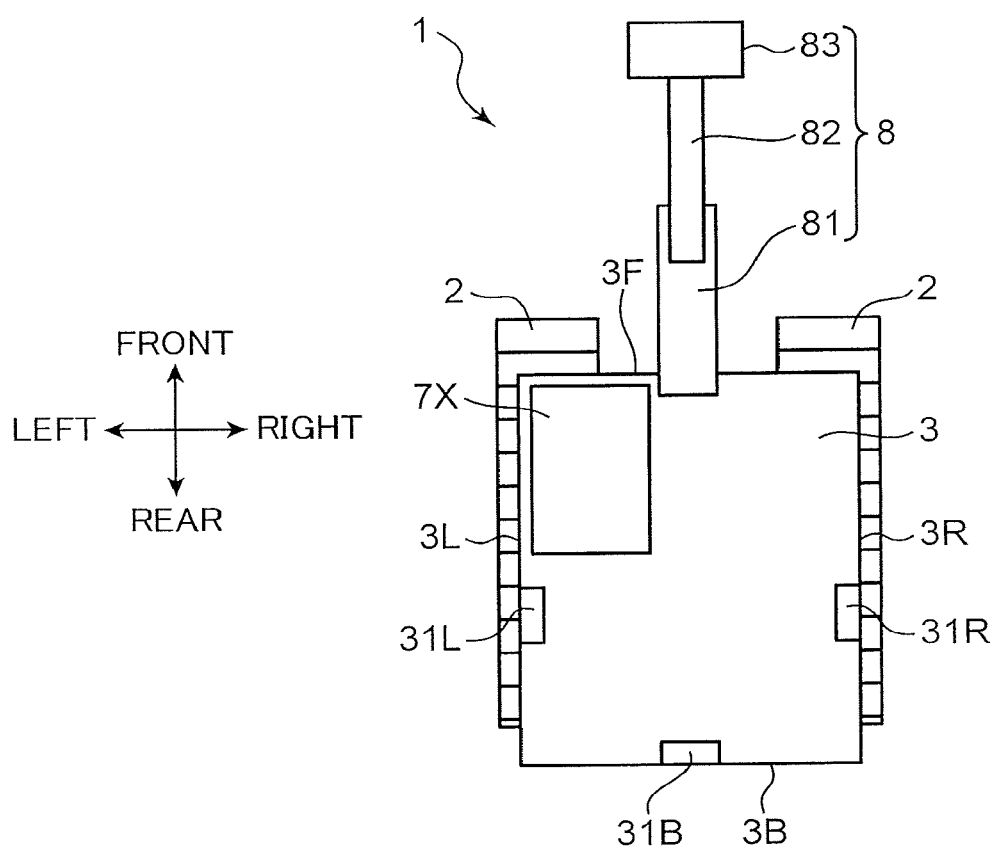
FIG. 2 is a view seen from a direction II in FIG. 1.

As shown in FIG. 2, the upper slewing body 3 includes a left side sensor 31L, a right side sensor 31R, and a rear side sensor 31B. The left side sensor 31L is provided on a left side surface 3L of the upper slewing body 3, and the right side sensor 31R is provided on a right side surface 3R of the upper slewing body 3. Additionally, the rear side sensor 31B is provided on a rear side surface 3B of the upper slewing body 3.

In the example in FIG. 2, the upper slewing body 3 has a square shape viewed from above including a front side surface 3F, the left side surface 3L, the right side surface 3R, and the rear side surface 3B. This is, however, only one example, and the upper slewing body 3 can be configured such that the rear side surface 3B has a circular shape viewed from above.

In the example in FIG. 2, the left side sensor 31L and the right side sensor 31R are arranged slightly closer to the rear side with respect to the center of the left side surface 3L and the center of the right side surface 3R so as to be linearly symmetrical to a center line of the upper slewing body 3 in the front-rear direction. This is, however, only one example, and the left side sensor 31L and the right side sensor 31R may be arranged at a predetermined position such as the center of the left side surface 3L and the center of the right side surface 3R, respectively. Additionally, in the example in FIG. 2, the rear side sensor 31B is arranged at the center of the rear side surface 3B of the upper slewing body 3. This is, however, only one example, and the rear side sensor 31B can be arranged at a position other than the center of the rear side surface 3B.

The left side sensor 31L, the right side sensor 31R, and the rear side sensor 31B are each configured by a three-dimensional distance measuring sensor. Here, the left side sensor 31L, the right side sensor 31R, and the rear side sensor 31B form one example of an obstacle sensing sensor according to the present invention. As a three-dimensional distance measuring sensor, for example, a TOF (Time of Flight) infrared distance sensor can be adopted which calculates a distance based on time of reciprocation of an infrared laser projected onto a target object. In detail, as an infrared distance sensor, an infrared distance image sensor is adopted which measures a distance image indicative of a distribution of distances to an object at the front.

Additionally, the upper slewing body 3 includes a driver's cab 7X, a working device 8, an engine (not illustrated), and the like in addition to the left side sensor 31L, the right side sensor 31R, and the rear side sensor 31B. The driver's cab 7X is provided on the front left of the upper slewing body 3 and houses an operator. The working device 8 includes a boom 81, an arm 82, and an attachment 83. The boom 81 is swingably attached to the front side surface 3F. The arm 82 is swingably attached to the boom 81. The attachment 83 is configured by a machine such as, for example, a bucket, a nibbler, or the like, and is swingably attached to the arm 82. The engine (not illustrated) is a power source of the hydraulic excavator 1. The engine (not illustrated), which is mechanically connected to, for example, a hydraulic pump, causes the hydraulic pump to operate, thereby causing the lower travelling body 2 to travel, the upper slewing body 3 to slew, and the working device 8 to operate.

Figure 3:
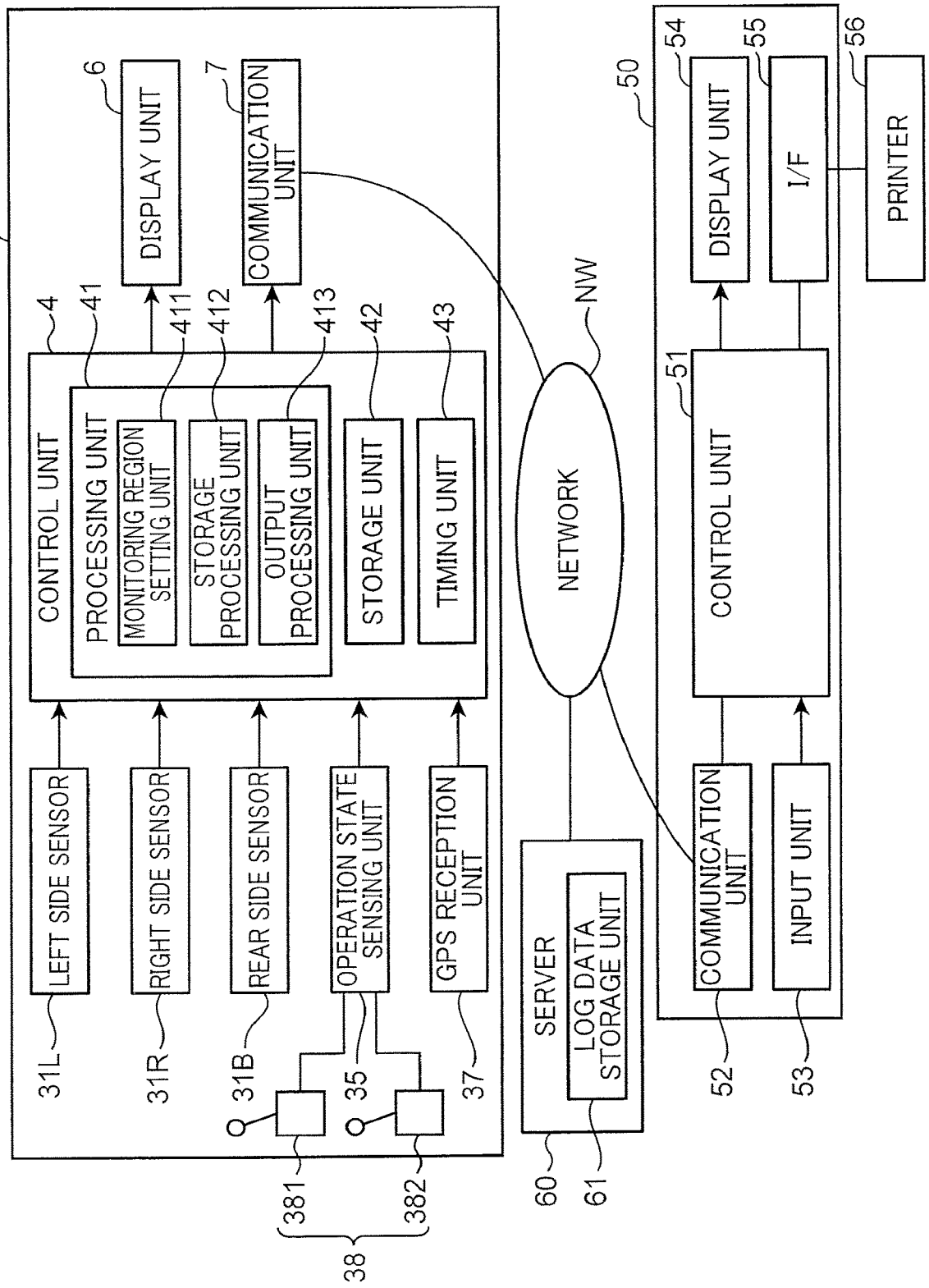
FIG. 3 is a block diagram of an obstacle monitoring system including the hydraulic excavator.

FIG. 3 is a block diagram of an obstacle monitoring system 100 including the hydraulic excavator 1. As shown in FIG. 3, the obstacle monitoring system 100 includes the hydraulic excavator 1, an information processing device 50, and a server 60. The hydraulic excavator 1, the information processing device 50, and the server 60 are communicably connected to each other via a network NW. As the network NW, for example, a cellular phone communication network may be adopted, the Internet may be adopted, or a satellite communication line may be adopted.

As shown in FIG. 3, the hydraulic excavator 1 further includes an operation state sensing unit 35, a GPS reception unit 37, a control unit 4, a display unit 6, a communication unit 7, and an operation lever 38 in addition to the left side sensor 31L, the right side sensor 31R, and the rear side sensor 31B shown in FIG. 2.

When an obstacle is present in a stop region 310L or a deceleration region 311L (see FIG. 4) set by a monitoring region setting unit 411, the left side sensor 31L outputs a sensing signal including distance measurement data of the obstacle to the control unit 4.

When an obstacle is present in a stop region 310R or a deceleration region 311R (see FIG. 4) set by the monitoring region setting unit 411, the right side sensor 31R outputs the sensing signal including the distance measurement data of the obstacle to the control unit 4.

When an obstacle is present in a stop region 310B or a deceleration region 311B (see FIG. 4) set by the monitoring region setting unit 411, the rear side sensor 31B outputs the sensing signal including the distance measurement data of the obstacle to the control unit 4. A stop region 310 is one example of a first region and a deceleration region 311 is one example of a second region.

As distance measurement data of an obstacle, for example, two-dimensional or three-dimensional position data can be adopted which indicates one position at which an obstacle approaches most to the hydraulic excavator 1. As two-dimensional position data, two-dimensional data can be adopted which is configured by an x component and a y component indicating a horizontal plane, and as three-dimensional position data, three-dimensional data can be adopted which is configured by a z component indicating a height component orthogonal to the horizontal plane in addition to the x component and the y component. Additionally, when a plurality of obstacles are present, if the left side sensor 31L, the right side sensor 31R, and the rear side sensor 31B sense a plurality of obstacles, it is only necessary to include position data of the plurality of obstacles in a sensing signal.

The operation lever 38 is provided in the driver's cab 7X and includes a travelling operation lever 381 which causes the lower travelling body 2 to travel and a slewing operation lever 382 which causes the upper slewing body 3 to slew.

The travelling operation lever 381 is configured to be slantable, for example, in the front-rear direction, and when progressing the lower travelling body 2, e.g., to slant, for example, in a forward direction, and when moving the lower travelling body 2 backward, to slant in a rearward direction. Additionally, the travelling operation lever 381 has a fixed angle range set to be a neutral range, the fixed angle range including an amount of slant of zero.

The slewing operation lever 382 is configured to be slantable, for example, in the right and left direction, and when slewing the upper slewing body 3 in a right direction, to slant, for example, in the right direction, and when slewing the upper slewing body 3 in a left direction, to slant, for example, in the left direction. Additionally, the slewing operation lever 382 has a fixed angle range set to be a neutral range, the fixed angle range including an amount of slant of zero.

The operation state sensing unit 35 senses which state of "slewing", "travelling", "slewing+travelling (slewing and travelling)", and "others", the hydraulic excavator 1 is in by sensing each state of the travelling operation lever 381 and the slewing operation lever 382.

Here, the operation state sensing unit 35 includes a sensor which senses an amount of slant of each of the travelling operation lever 381 and the slewing operation lever 382, and a processor which determines a state of the hydraulic excavator 1 from a detection result obtained by the sensor. As the sensor, for example, a hydraulic sensor which senses each pilot pressure of the travelling operation lever 381 and the slewing operation lever 382, or a potentiometer which senses a slant angle can be adopted.

"slewing" as used herein represents a state where the upper slewing body 3 clews with respect to the lower travelling body 2. "Travelling" represents a state where at least one of right and left crawlers is in operation. "slewing+travelling" represents a state where slewing and travelling operations are conducted simultaneously. "Others" represents a state where none of slewing and travelling is conducted, which state includes an idling state and a state where a work attachment such as a bucket is operated. The operation state sensing unit 35 is one example of an operation state information obtaining unit according to the present invention.

The GPS reception unit 37 receives a signal transmitted from a plurality of GPS satellites and calculates position information and direction information of the hydraulic excavator 1 based on the received signal. The GPS reception unit 37 is configured by, for example, a GPS sensor, and is one example of a position information reception unit according to the present invention.

The control unit 4 has a processing unit 41, a storage unit 42, and a timing unit 43. The processing unit 41 is configured by, for example, CPU, RAM, ROM, or the like, and executes various processing including processing (to be described later) of the flow charts shown in FIG. 5 to FIG. 8.

In detail, the processing unit 41 includes the monitoring region setting unit 411, a storage processing unit 412, and an output processing unit 413. The monitoring region setting unit 411 sets a monitoring region for monitoring entry of an obstacle in the surroundings of the upper slewing body 3. Shape data for defining a shape of a monitoring region is stored in advance in the storage unit 42. Therefore, the monitoring region setting unit 411 only needs to read shape data from the storage unit 42 to set a monitoring region.

When at least one of the left side sensor 31L, the right side sensor 31R, and the rear side sensor 31B senses an obstacle in a predetermined fixed period, the storage processing unit 412 generates approach information indicating that an obstacle has been sensed to accumulatively store the generated approach information as log data in a log data table TB1 (see FIG. 9) stored in the storage unit 42.

The output processing unit 413 outputs log data accumulatively stored in the storage unit 42 in a fixed period to display the log data on at least one of the display unit 6 and a display unit 54 of the information processing device 50. Here, when displaying log data on the display unit 6, the output processing unit 413 outputs the log data to the display unit 6, and when displaying log data on the display unit 54, outputs the log data to the network NW using a communication unit 52. The display unit 6 and the information processing device 50 form one example of a display device.

The storage unit 42 stores the log data table TB1 (see FIG. 9) to be described later. The log data table TB1 is a table for recording, as log data, approach information indicating that an obstacle has been sensed around the hydraulic excavator 1. Recording processing of log data will be detailed later.

Additionally, the storage unit 42 stores an identification number (identification information) of own machine. Here, as an identification number, a symbol string can be adopted which is uniquely assigned to distinguish each hydraulic excavator 1. The storage unit 42 is configured by a non-volatile memory such as a flash memory or the like which holds storage contents even when power of the hydraulic excavator 1 is turned off.

The timing unit 43 is configured by, for example, a timer and outputs present time in response to an instruction output from the processing unit 41. The timing unit 43 is one example of a time information obtaining unit according to the present invention.

The display unit 6 is configured by a display device provided in the driver's cab 7X, such as a liquid crystal panel, an organic electro-luminescence panel, or the like, to display various screens. The communication unit 7 is configured by, for example, a communication module which communicably connects the hydraulic excavator 1 with the network NW to receive data transmitted from an external device such as the information processing device 50, the server 60, and the like, as well as transmitting the data to the external device.

The server 60 is configured by a computer including a processor such as a CPU, FPGA, or the like, and a log data storage unit 61 formed by a non-volatile storage device. The server 60 is managed, for example, by a construction machine manufacturer, and receives log data transmitted from at least one construction machine including the hydraulic excavator 1 via the network NW and stores the log data.

The log data storage unit 61 stores log data transmitted from one or a plurality of construction machines including the hydraulic excavator 1. Additionally, upon receiving a request for obtaining log data from the information processing device 50, the server 60 transmits log data to be stored to the information processing device 50.

The information processing device 50 receives, from the server 60, information transmitted from the hydraulic excavator 1 and causes the display unit 54 to display the information. The information processing device 50 is configured by a computer including, for example, a processor such as a CPU, and a volatile or non-volatile storage device. The information processing device 50 is configured by a personal computer installed in, for example, a company which executes construction (hereinafter, referred to as a "constructor company"), or the like.

The information processing device 50 includes a control unit 51, the communication unit 52, an input unit 53, the display unit 54, and an interface (I/F) 55. The control unit 51 is configured by a computer including, for example, a processor such as a CPU or the like, and a memory such as a RAM and a ROM, and conducts various computations, as well as controlling the communication unit 52, the input unit 53, the display unit 54, and the I/F 55.

The communication unit 52 is configured by a communication module for connecting the information processing device 50 to the network NW, and receives various data transmitted from the information processing device 50 and the server 60 via the network NW, as well as transmitting various data to the information processing device 50 and the server 60. The input unit 53 is configured by, for example, an input device such as a keyboard, a mouse, or the like, and accepts various instructions from a user. The display unit 54 is configured by, for example, a display device such as a liquid crystal display, an organic electro-luminescence display, or the like. The I/F 55 is configured by, for example, a USB interface, and is connected to a printer 56 via a USB cable. The display unit 54 is one example of a display.

The information processing device 50 can be configured by a portable information processing device such as a tablet terminal, a smartphone, or the like, or configured by a desktop computer.

The hydraulic excavator 1, the server 60, and the information processing device 50 described in the foregoing based on FIG. 3 constitute the obstacle monitoring system 100.

Figure 4:
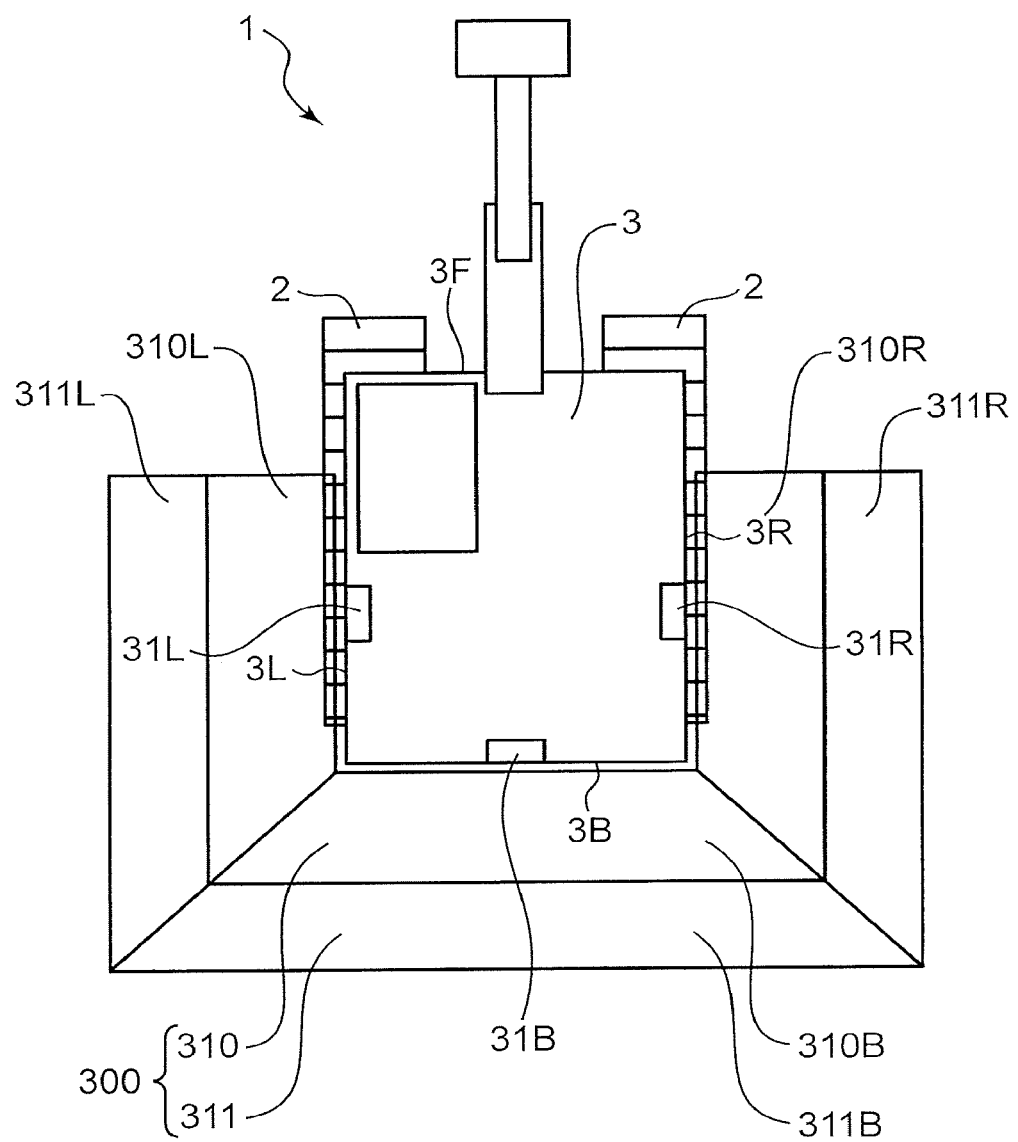
FIG. 4 is a view showing a monitoring region of the hydraulic excavator.

Subsequently, description will be made of a monitoring region 300 set around the hydraulic excavator 1 with reference to FIG. 4. FIG. 4 is a view showing the monitoring region 300 of the hydraulic excavator 1. The monitoring region 300 is a region set around the hydraulic excavator 1 for sensing, as an obstacle, a person approaching the hydraulic excavator 1 and an object other than a person.

Here, the monitoring region 300 is set in a part that is directly visually unrecognizable by an operator. The monitoring region is not limited thereto but may be set in, in addition to the above unrecognizable part, a part directly visually recognizable by an operator.

The monitoring region 300 includes the stop region 310 and the deceleration region 311. The stop region 310 is a region set in proximity to the hydraulic excavator 1 for stopping operation of a machine when an obstacle enters the stop region. The deceleration region 311 is a region provided outside the stop region 310 for decelerating operation of the machine when an obstacle enters the deceleration region. The stop region 310 includes the three stop regions 310L, 310R, and 310B. The deceleration region includes the three deceleration regions 311L, 311R, and 311B. Here, "stopping operation of a machine" corresponds to preventing the lower travelling body 2 and the upper slewing body 3 from operating even when, for example, the travelling operation lever 381 and the slewing operation lever 382 are being operated, and corresponds to preventing the working device 8 from operating irrespective of operation by an operator. Additionally, "deceleration of operation of a machine" corresponds to, for example, causing the lower travelling body 2 to travel at a speed lower than a travelling speed according to an operation amount of the travelling operation lever 381, causing the upper slewing body 3 to slew at a speed lower than a slewing speed according to an operation amount of the slewing operation lever 382, limiting a movable range of the working device 8, and the like.

The stop region 310L and the deceleration region 311L are regions set on the left side of the hydraulic excavator 1 and are regions to be sensed by the left side sensor 31L. The stop region 310R and the deceleration region 311R are regions set on the right side of the hydraulic excavator 1 and are regions to be sensed by the right side sensor 31R. The stop region 310B and the deceleration region 311B are regions set in the rear of the hydraulic excavator 1 and are regions to be sensed by the rear side sensor 31B.

In detail, the stop region 310 and the deceleration region 311 each have a shape linearly symmetrical to the center line of the upper slewing body 3 in the front-rear direction viewed from above. Additionally, the stop region 310 and the deceleration region 311 can be each configured by two-dimensional data including the x component and the y component indicating the respective positions on a horizontal plane, or configured by three-dimensional data including the z component indicating a height direction in addition to the x component and the y component.

The stop region 310 is a region having a fixed width and surrounding the upper slewing body, viewed from above, from an area at a position more or less displaced from a front end of the left side surface 3L to the rear side to an area at a position more or less displaced from a front end of the right side surface 3R to the rear side via the rear side surface 3B. The deceleration region 311 is a region having a fixed width surrounding the outer side of the stop region 310 viewed from above.

Shape data for defining shapes of the stop region 310 and the deceleration region 311 is stored in advance in the storage unit 42. Accordingly, the monitoring region setting unit 411 only needs to set the stop region 310 and the deceleration region 311 using shape data. As the shape data, assuming that the stop region 310 and the deceleration region 311 are configured by two-dimensional data, two-dimensional position data of each apex with respect to a certain point (e.g., the center) of the hydraulic excavator 1 can be adopted.

When the sensing signal is output from the left side sensor 31L, the storage processing unit 412 determines in which one of the stop region 310L and the deceleration region 311L an obstacle is located, based on the distance measurement data included in the sensing signal, and causes the RAM to store a determination result.

When the sensing signal is output from the right side sensor 31R, the storage processing unit 412 determines in which one of the stop region 310R and the deceleration region 311R an obstacle is located, based on the distance measurement data included in the sensing signal, and causes the RAM to store a determination result.

When the sensing signal is output from the rear side sensor 31B, the storage processing unit 412 determines in which one of the stop region 310B and the deceleration region 311B an obstacle is located, based on the distance measurement data included in the sensing signal, and causes the RAM to store a determination result.

Additionally, when a plurality of obstacles are included in the distance measurement data, the storage processing unit 412 only needs to specify an obstacle located closest to the hydraulic excavator 1, and determine in which one of the stop region 310 and the deceleration region 311, the specified obstacle is located.

Next, with reference to FIG. 5 to FIG. 8, the log data recording processing according to the present embodiment will be described. The log data recording processing is executed by the processing unit 41 of the control unit 4. In the following description, step will be abbreviated as "S".

Figure 5:
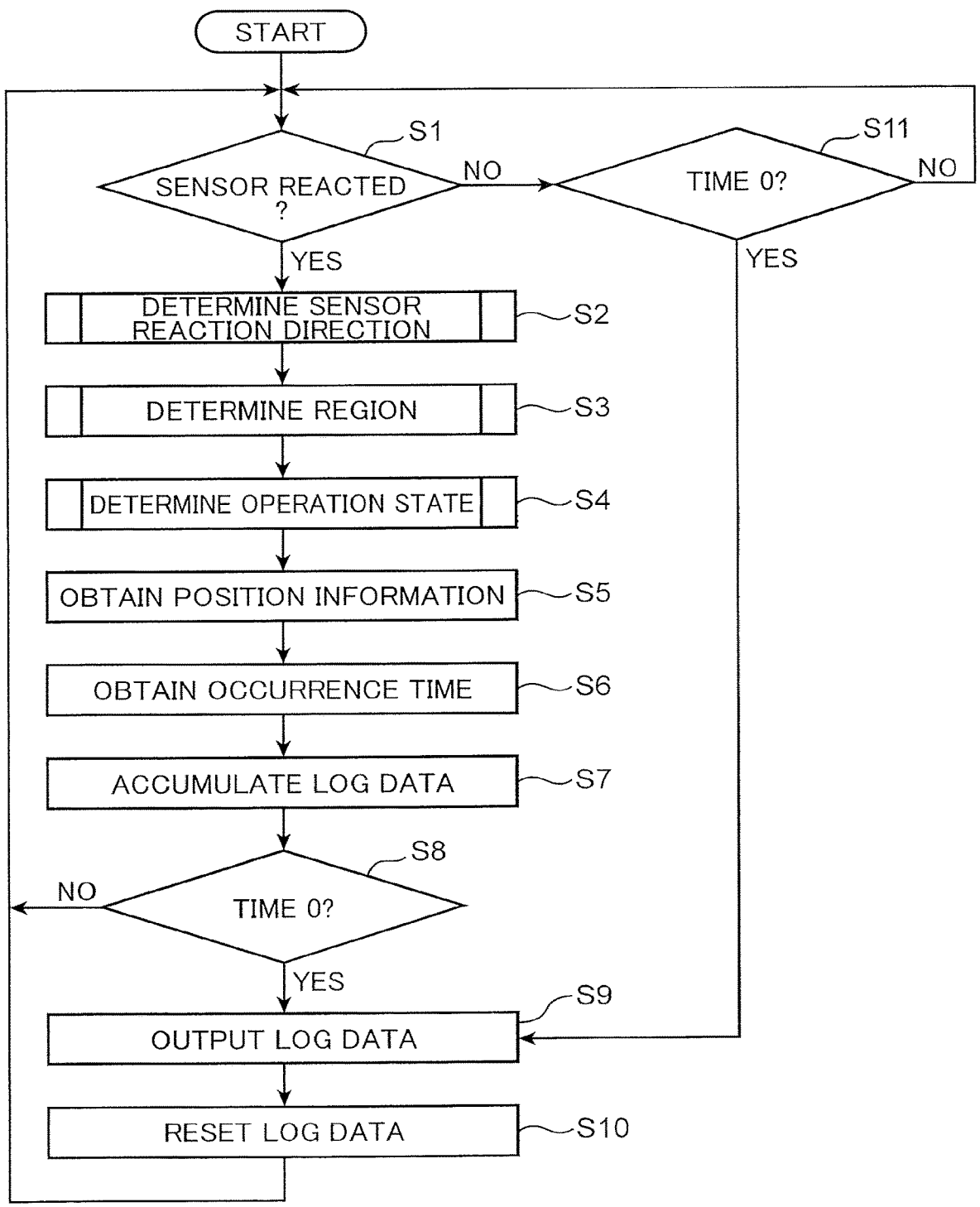
FIG. 5 is a flow chart showing log data recording processing according to the present embodiment.

FIG. 5 is a flow chart showing log data recording processing according to the present embodiment. The log data recording processing is started by the processing unit 41, for example, when an operator inputs an instruction to start operation to the hydraulic excavator 1, so that power of the control unit 4 is turned on. First, the storage processing unit 412 of the processing unit 41 determines whether at least one of the left side sensor 31L, the right side sensor 31R, and the rear side sensor 31B reacted to an obstacle (S1). When at least one of the left side sensor 31L, the right side sensor 31R, and the rear side sensor 31B reacted to an obstacle (S1: YES), the storage processing unit 412 executes sensor reaction direction determination processing for determining which of the left side sensor 31L, the right side sensor 31R, and the rear side sensor 31B has reacted to the obstacle (S2). By contrast, when determining that none of the left side sensor 31L, the right side sensor 31R, and the rear side sensor 31B has reacted to the obstacle (S1: NO), the storage processing unit 412 advances the processing to S11.

By the sensor reaction direction determination processing (S2), determination is made as to which of the left side sensor 31L, the right side sensor 31R, and the rear side sensor 31B has reacted.

Figure 6:
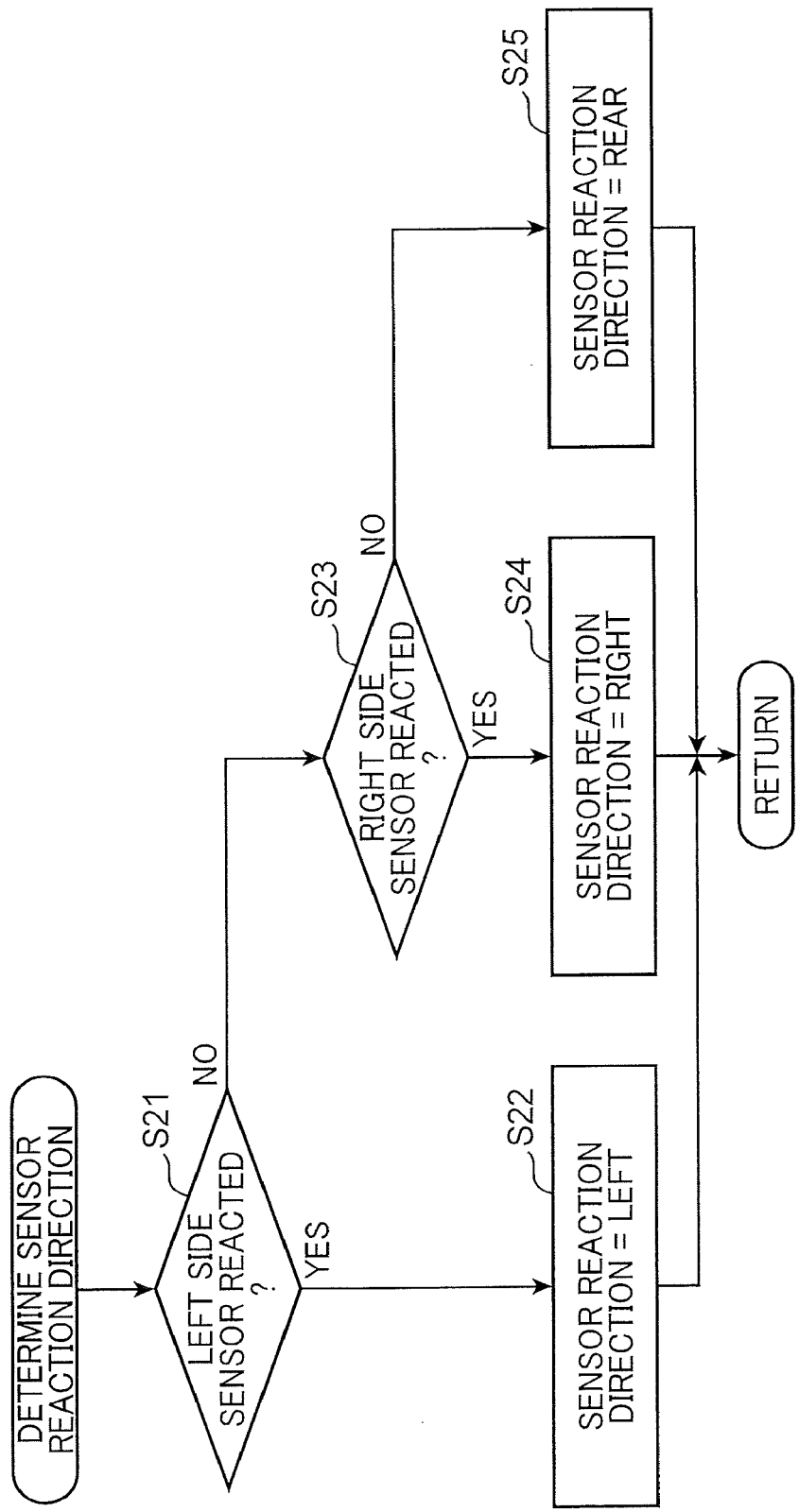
FIG. 6 is a flow chart showing sensor reaction direction determination processing.

FIG. 6 is a flow chart showing the sensor reaction direction determination processing. As shown in FIG. 6, when determining in S21 that the left side sensor 31L has reacted (S21: YES), the storage processing unit 412 generates sensor reaction direction information that "the sensor reaction direction"="left", the information indicating that the sensor reaction direction is leftward, and stores the information in the RAM (S22). On the other hand, when determination is not made in S21 that the left side sensor 31L has reacted (S21: NO), the processing proceeds to S23.

In S23, when determining that the right side sensor 31R has reacted (S23: YES), the storage processing unit 412 generates sensor reaction direction information that "the sensor reaction direction"="right", the information indicating that the sensor reaction direction is rightward, and stores the information in the RAM (S24). On the other hand, when determination is made in S23 that the right side sensor 31R has not reacted (S23: NO), the storage processing unit 412 generates sensor reaction direction information that "the sensor reaction direction"="rear", the information indicating that the sensor reaction direction is rearward, and stores the information in the RAM (S25). When the processing of S22, S24, and S25 ends, the processing returns to S3 in FIG. 5.

Thus, the storage processing unit 412 determines a sensor reaction direction indicating a direction of entry of an obstacle into the monitoring region based on an arrangement position of a sensor reacted to an obstacle among the left side sensor 31L, the right side sensor 31R, and the rear side sensor 31B, and causes the RAM to store the sensor reaction direction information.

Next, the storage processing unit 412 executes region determination processing (S3). The region determination processing is processing to determine in which one of the stop region 310 and the deceleration region 311 shown in FIG. 4 an obstacle has been sensed.

Figure 7:
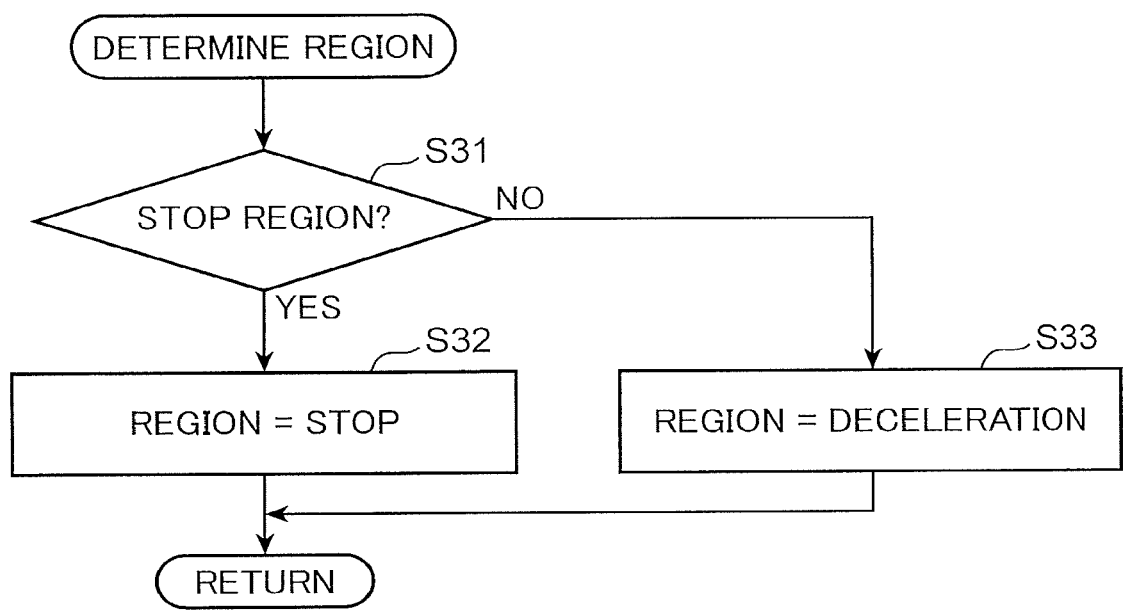
FIG. 7 is a flow chart showing region determination processing.

FIG. 7 is a flow chart showing the region determination processing. In S31, the storage processing unit 412 obtains, from the reacted sensor, the sensing signal including the distance measurement data of an obstacle sensed by the sensor reacted to the obstacle among the left side sensor 31L, the right side sensor 31R, and the rear side sensor 31B. Then, in S31, based on the obtained distance measurement data, the storage processing unit 412 determines in which one of the stop region 310 and the deceleration region 311 the obstacle has been sensed.

In S31, when determining that an obstacle has been sensed in the stop region 310 (S31: YES), the storage processing unit 412 generates region information that "region"="stop", the information indicating that an obstacle has been sensed in the stop region 310, and stores the information in the RAM (S32). On the other hand, when determination is made that an obstacle has been sensed in the deceleration region 311 (S31: NO), the storage processing unit 412 generates region information that "region"="deceleration", the information indicating that an obstacle has been sensed in the deceleration region 311, and stores the information in the RAM (S33). When the processing of S32 or S33 ends, the processing returns to S4 in FIG. 5.

In S4, the operation state sensing unit 35 executes operation state determination processing (S4). The operation state determination processing is processing for determining in which state of "slewing", "travelling", "slewing+travelling", and "others", the hydraulic excavator 1 is based on a state of the operation lever 38.

FIG. 8 is a flow chart showing the operation state determination processing. In S41, the operation state sensing unit 35 determines whether the upper slewing body 3 is slewing (S41). Here, when an amount of slant of the slewing operation lever 382 exceeds a neutral range, the operation state sensing unit 35 only needs to determine that the upper slewing body is slewing.

When determination is made in S41 that the upper slewing body 3 is slewing (S41: YES), the operation state sensing unit 35 determines whether the lower travelling body 2 is travelling (S42). Here, when an amount of slant of the travelling operation lever 381 exceeds a neutral range, the operation state sensing unit 35 only needs to determine that the lower travelling body 2 is travelling.

In S42, when determination is made that the lower travelling body 2 is travelling (S42: YES), the storage processing unit 412 generates operation state information that "operation"="slewing+travelling", the information indicating that the operation state is in-slewing and in-travelling, and stores the information in the RAM (S43). When determination is made in S42 that the lower travelling body 2 is not travelling (S42: NO), the storage processing unit 412 generates operation state information that "operation"="slewing", the information indicating that the operation state is in-slewing, and stores the information in the RAM (S44).

When determination is made in S41 that the upper slewing body 3 is not slewing (S41: NO), the operation state sensing unit 35 determines whether the lower travelling body 2 is travelling (S45). When determination is made in S45 that the lower travelling body 2 is travelling (S45: YES), the storage processing unit 412 generates operation state information that "operation"="travelling", the information indicating that the operation state is in-travelling, and stores the information in the RAM (S46). On the other hand, when determination is made that the lower travelling body 2 is not travelling in S45 (S45: NO), the storage processing unit 412 generates operation state information that "operation"="others", the information indicating that the operation state is none of in-travelling, in-slewing, and in-travelling and-slewing, and stores the information in the RAM (S47). When the processing of S43, S44, S45, S46, and S47 ends, the processing returns to S5 in FIG. 5.

In S5, the storage processing unit 412 obtains position information of the hydraulic excavator 1 from the GPS reception unit 37 and stores the position information in the RAM.

In S6, the storage processing unit 412 obtains present time from the timing unit 43 and stores the present time in the RAM as occurrence time information which indicates time of occurrence of sensing of an obstacle. Since time from S1 at which an obstacle is actually sensed to S6 at which the present time is obtained is so short that a time lag is negligible, S6 is executed immediately after S5 in the flow chart in FIG. 5. This is, however, only one example, and the processing of S6 can be executed immediately after S1 for reducing the time lag.

In S7, the storage processing unit 412 reads, from the RAM, the sensor reaction direction determined in Step S2, the region information generated in Step S3, the operation state information generated in Step S4, the position information obtained in Step S5, and the occurrence time information obtained in Step S6, generates log data by correlating the read information and an identification number of own machine, and accumulatively stores the obtained results in the log data table TB1 shown in FIG. 9. As described above, since the log data table TB1 is stored in the non-volatile storage unit 42, storage contents are held even when power of the control unit 4 is turned off.

In S8, the output processing unit 413 obtains the present time from the timing unit 43 to determine whether the present time indicates time 0. When the present time indicates time 0 (S8: YES), log data stored in the storage unit 42 is output (S9). More specifically, the output processing unit 413 transmits the log data accumulated in the log data table TB1 to the server 60 using the communication unit 7. Specifically, in the present embodiment, one day is adopted as a fixed period, and log data stored in one day period is transmitted to the server 60 at the end of one day.

In S10, the output processing unit 413 erases the log data stored in the log data table TB1 to return the processing to S1. This ensures a free capacity in the storage unit 42.

On the other hand, when the present time does not indicate time 0 in S8 (S8: NO), the processing returns to S1, to subsequently monitor which sensor of the left side sensor 31L, the right side sensor 31R, and the rear side sensor 31B has reacted. While none of the sensors reacts, the processing of S1 and S11 will be repeated (S1: NO, S11: NO). Additionally, when the present time comes to 0 while no sensor reacts (S11: YES), the output processing unit 413 transmits the log data stored in the log data table TB1 to the server 60 (S9), and the storage processing unit 412 erases the log data from the log data table TB1 (S10). The log data accumulated in the log data table TB1 is one example of approach information according to the present invention.

FIG. 9 is a diagram showing one example of the log data table TB1 which the hydraulic excavator stores and outputs. The log data table TB1 is a data base in which one log data is allotted to one record, and is provided with fields of "occurrence time", "identification number", "operation state", "region", "sensor reaction direction", and "occurrence position". In the field of "occurrence time", occurrence time information indicative of time when sensor reacts is stored. In the example in FIG. 9, the occurrence time information is configured by data indicative of year, month, day, hour, and minute. In the field of "identification number", an identification number of the hydraulic excavator 1 is stored. In the field of "operation state", the operation state information is stored which indicates an operation state of the hydraulic excavator 1 when the sensor reacts. Since the operation state information here includes "slewing", "travelling", "slewing+travelling", and "others", relevant operation state information among these pieces of the operation state information is stored in the field of "operation state".

In the field of "region", region information is stored which indicates a region in which an obstacle detected when the sensor reacts is located. In the example of FIG. 9, in the field of "region", region information of "stop" is stored when an obstacle is located in the stop region 310, and region information of "slewing" is stored when the obstacle is located in the deceleration region 311.

In the field of "sensor reaction direction", the sensor reaction direction information indicating any of "left", "right", and "rear" directions determined by the sensor reaction direction determination processing is stored. In the field of "occurrence position", position information indicative of a position of the hydraulic excavator 1 when the sensor reacts is stored. Here, position information stored in the field of "occurrence position" is configured by data of a latitude and a longitude.

In the example in FIG. 9, log data of the hydraulic excavator 1 with an identification number of N151 as of Feb. 6, 2017 is stored. For example, the first row of the log data shows log data obtained when an obstacle has been sensed at 13:00 on Feb. 6, 2017. The first row of the log data shows that the hydraulic excavator 1 has the operation state of "slewing", that an obstacle was located in the deceleration region 311, that the sensor reaction direction was "left", and that the occurrence position was "latitude:+36.19090, longitude:+136.27415".

Next, processing to be executed on the information processing device 50 side will be described. By the above-described log data recording processing shown in FIG. 5, log data of the previous day is stored in the server 60. Here, when a constructor company operates a plurality of construction machines including the hydraulic excavator 1, log data transmitted from the plurality of construction machines is stored in the server 60.

More specifically, in the server 60, a log data table TB2 shown in FIG. 10 is stored. FIG. 10 is a diagram showing one example of the log data table TB2 stored by the server 60. The log data table TB2 is a data base in which one log data is allotted to one record, and includes fields of "occurrence time", "identification number", "operation state", "region", "sensor reaction direction", and "occurrence position". Contents of the data stored in these fields are the same as those of the data described with reference to FIG. 9.

The example in FIG. 10 shows log data of one day, Feb. 6, 2017, which is transmitted from three construction machines with identification numbers "N151", "N152", and "N153". Among them, the identification number N151 is an identification number of the hydraulic excavator 1 which has transmitted the log data table TB1 shown in FIG. 9. Accordingly, the log data table TB2 includes information of the log data table TB1.

Here, a manager (site supervisor etc.) of a constructor company accesses the server 60 using the information processing device 50. By using the communication unit 52, the information processing device 50 receives log data included in the log data table TB2 stored in the server 60. The manager conducts predetermined operation for causing the input unit 53 to display an overall daily report DR1 (FIG. 11). When the input unit 53 accepts the predetermined operation, the control unit 51 of the information processing device 50 generates the overall daily report DR1 based on an identification number and an occurrence position among log data included in the received log data table TB2, and causes the display unit 54 to display the report. Alternatively, the manager may print the overall daily report DR1 on a paper using the printer 56. Here, the server 60 only needs to transmit log data related to a construction machine managed by the manager of the information processing device 50 among data in the log data table TB2 to the information processing device 50. The server 60 only needs to specify, from predetermined identification information given to a manager, a construction machine managed by the relevant manager. The overall daily report DR1 is one example of a first report.

The overall daily report DR1 shown in FIG. 11 is used, for example, for grasping the overview of a position of a construction machine to be managed and a sensing frequency of an obstacle in each construction machine. In the overall daily report DR1, on a map image, icons R1 to R3, an icon Y1, and icons B1 to B3 of three construction machines with the identification numbers N151, N152, and N153 are displayed in three colors, red, yellow, and blue. In FIG. 11, however, red, yellow, and blue are represented by patterns of slanting lines, dots, and vertical lines, respectively, for convenience's sake. Although in the example in FIG. 11, the icons R1 to R3, the icon Y1, and the icons B1 to B3 of the construction machines are displayed in three colors of red, yellow, and blue, respectively, this is only one example and may be displayed in other colors. The icons R1 to R3, the icon Y1, and the icons B1 to B3 are one or a plurality of construction machine images indicating one or a plurality of the hydraulic excavators 1 in which an obstacle has been sensed on an obstacle sensing occurrence position basis, the images forming one example of a construction machine image visually showing the number of times when an obstacle has been sensed on an occurrence position basis.

Here, the control unit 51 only needs to determine a display position of an icon on a map image using position information, "occurrence position", included in log data of one day which is received from the server 60. Additionally, the control unit 51 only needs to determine a color of the icon to be displayed on the determined display position using "identification number" included in the received log data of one day. Here, the control unit 51 only needs to obtain data of the map image from an external server. Alternatively, when a memory of the information processing device 50 stores a map image in advance, it is only necessary to obtain data of a map image from the memory. Here, because data of a latitude and a longitude is correlated to a map image, the control unit 51 only needs to determine a display position of an icon by collating latitude and longitude data correlated with a map image with latitude and longitude data indicated by position information of an occurrence position of log data.

The construction machines with the identification number N151 and the identification number N153 are represented by a plurality of icons R1, R2, and R3 and the icons B1, B2, and B3, respectively. Therefore, it can be found that the construction machine with the identification number N151 and the construction machine with the identification number N153 conducted work at a plurality of positions in one day.

Additionally, a size of a circle of an icon representing a construction machine shows the number of occurrences of obstacle sensing on an occurrence position basis. For example, since the icons R3, B2, and B3 have the number of occurrences of obstacle sensing on an occurrence position basis of 0 or more and less than 1, the control unit 51 sets the size of the circle to be a first size. Since the icons R2, Y1, and B1 have the number of occurrences of obstacle sensing on an occurrence position basis of 2 or more and less than 3, the control unit 51 sets the size of the circle to be a second size larger than the first size. Since the icon R1 has the number of occurrences of obstacle sensing on an occurrence position basis of 4 or more, the size of the circle is set to be a third size larger than the second size.

In detail, the control unit 51 only needs to classify log data of one day received from the server 60 according to a construction machine and an occurrence position and calculate the number of pieces of log data belonging to each classification as the number of occurrences of obstacle sensing on an occurrence position basis. Then, the control unit 51 only needs to set a size of an icon of a construction machine to the first size when the number of occurrences of obstacle sensing on an occurrence position basis belongs to a first range (e.g., 0 or more and less than 1) corresponding to the first size. Additionally, the control unit 51 only needs to set the size of the icon of the construction machine to the second size when the number of occurrences of obstacle sensing on an occurrence position basis belongs to a second range (e.g., 2 or more and less than 3) corresponding to the second size. Additionally, the control unit 51 only needs to set the size of the icon of the construction machine to the third size when the number of occurrences of obstacle sensing on an occurrence position basis belongs to a third range (e.g., 4 or more) corresponding to the third size. Although herein, the control unit 51 sets the icons to have a size in three stages, the present invention is not limited thereto and can be set to have a size in four or more stages or two or less stages. Alternatively, the control unit 51 can set the icons to have a size continuously increasing as the number of occurrences of obstacle sensing on an occurrence position basis increases.

Additionally, the control unit 51 displays a table T1 on a map image by superposing in the overall daily report DR1. In the table T1, one construction machine is assigned to one row which includes a field of "discrimination color", a field of "identification number", and a field of "the number of added occurrences". In the example of the table T1 shown in FIG. 11, a construction machine with the identification number N151 is assigned to a first row, a construction machine with the identification number N152 is assigned to a second row, and a construction machine with the identification number N153 is assigned to a third row.

In the field of "discrimination color", a color applied to an icon for each construction machine is displayed. Through the color applied to the field of "discrimination color", the manager can correlate an icon displayed on the map image with "identification number" and "the number of added occurrences".

Since the construction machines with the identification number N151, the identification number N152, and the identification number N153 are displayed with red, yellow, and blue icons, respectively, in the field of "discrimination color", red, yellow, and blue are displayed in the first row, the second row, and the third row.

In the field of "identification number", an identification number of a construction machine whose icon is displayed in the overall daily report DR1 is displayed. In the table T1, a total value of the number of occurrences of obstacle sensing in each construction machine is displayed in the field of "the number of added occurrences". In detail, the control unit 51 classifies log data of one day received from the server 60 according to an identification number to calculate the number of pieces of log data belonging to each classification as the number of added occurrences of each construction machine.

Figure 12:
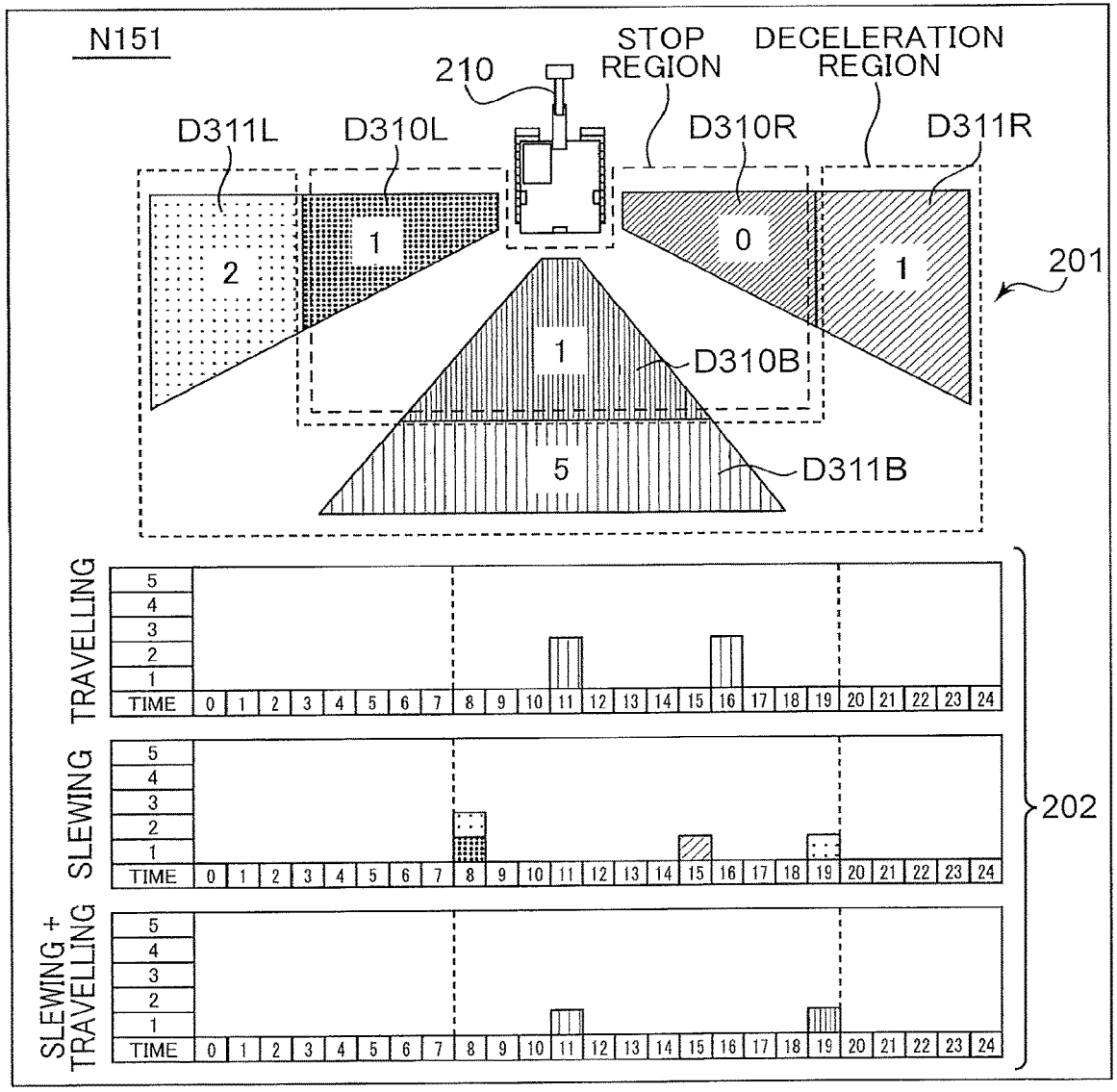
FIG. 12 is a diagram showing one example of a detailed daily report.

Next, a detailed daily report DR2 in FIG. 12 will be described. FIG. 12 is a diagram showing one example of the detailed daily report DR2. The detailed daily report DR2 is used, for example, as a material when a manager, in order to analyze what caused a construction machine to have occurrence of obstacle sensing, calls for a person concerned such as an operator of the construction machine to conduct hearing about how the machine was at that time. A manager corresponds to, for example, a site supervisor, and a person concerned corresponds to, for example, an operator of a construction machine.

The manager inputs, to the input unit 53, operation of selecting an icon of a construction machine to be analyzed on the overall daily report DR1 displayed on the display unit 54 (FIG. 11). Then, the control unit 51 causes the display unit 54 to display the detailed daily report DR2 related to the selected construction machine. Here, the manager does not select an icon but may cause the display unit 54 to display an input screen for inputting an identification number of the construction machine so that an identification number of the construction machine to be analyzed is input to the input screen, thereby causing the display unit 54 to display the detailed daily report DR2 related to construction machine to be analyzed.

In the example in FIG. 12, it is assumed that the construction machine with the identification number N151 is displayed.

The detailed daily report DR2 includes a chart by reaction direction and region 201, a chart by time zone 202, and a detailed table 203. The chart by reaction direction and region 201 is one example of a second report image which displays the number of times of obstacle sensing on a sensor reaction direction basis together with a construction machine image 210. The chart by time zone 202 is one example of a third report image which displays the number of times of obstacle sensing on a time zone basis based on time information included in approach information output from the construction machine in a specific period.

The chart by reaction direction and region 201 is generated by the control unit 51 and displayed on the display unit 54 based on, among the information in the log data table TB1, the sensor reaction direction information stored in the field of "sensor reaction direction" and the region information stored in the field of "region". The chart by reaction direction and region 201 is an image visually displaying, for each region of the stop regions 310L, 310R, and 310B, and the deceleration regions 311L, 311R, and 311B, the number of times of obstacle sensing per day together with the construction machine image 210 indicative of a construction machine.

In the chart by reaction direction and region 201, on the left side of the construction machine image 210, a region image D310L corresponding to the stop region 310L, and a region image D311L corresponding to the deceleration region 311L are displayed. On the right side of the construction machine image 210, a region image D310R corresponding to the stop region 310R, and a region image D311R corresponding to the deceleration region 311R are displayed. In the rear of the construction machine image 210, a region image D310B corresponding to the stop region 310B, and a region image D311B corresponding to the deceleration region 311B are displayed. Hereinafter, a region image, when collectively referred to, will be attached a code of D300.

The region images D310L, D310R, D310B, D311L, D311R, and D311B show one example of divided regions obtained by dividing a monitoring region image corresponding to the monitoring region 300 into a plurality of regions so as to correspond to the sensor reaction direction.

In the chart by reaction direction and region 201, each region image D300 is displayed with color-coding. For example, the region images D310L, D310R, and D310B corresponding to the stop regions 310L, 310R, and 310B are displayed in yellow with a first density, red with a first density, and blue with a first density, respectively. The region images D311L, D311R, and D311B corresponding to the deceleration regions 311L, 311R, and 311B are displayed in yellow with a second density lower than the first density, red with a second density, and blue with a second density, respectively. In other words, the region images D310L, D310R, and D310B corresponding to the stop regions 310L, 310R, and 310B are displayed in colors darker than those of the region images D311L, D311R, and D311B corresponding to the deceleration regions 311L, 311R, and 311B.

In each region image D300, a numerical value indicative of the number of times of obstacle sensing per day is displayed by superposing. For example, since the number of times of sensing per day in the stop region 310L is once, a numerical value of "1" is displayed on the region image D310L, and since the number of times of sensing per day in the deceleration region 311L is twice, a numerical value of "2" is displayed on the region image D311L.

Here, when sensing, in the overall daily report DR1, operation of selecting an icon of a construction machine displayed on a map image, the control unit 51 extracts one-day log data of a construction machine corresponding to the selected icon from among log data transmitted from the server 60. Then, the control unit 51 classifies the extracted log data according to a kind of the region information stored in the field of "region" and according to a kind of the sensor reaction direction information stored in the field of "sensor reaction direction" to specify the number of pieces of log data in each classification. Based on the specified number, the control unit 51 only needs to determine the number of times of obstacle sensing per day in each of the stop regions 310L, 310B, and 310R, and the deceleration regions 311L, 311B, and 311R.

Thus, since the chart by reaction direction and region 201 displays the number of times of obstacle sensing in each region together with the construction machine image 210, it is possible to allow a manager to grasp at once in which region, an obstacle has been sensed.

The chart by time zone 202 is generated based on the time information stored in the field of "occurrence time" and the operation state information stored in the field of "operation" among the information in the log data table TB1. The chart by time zone 202 is configured by bar charts indicating the number of times of obstacle sensing in each time zone sectioned by one hour in each operation state of "travelling", "slewing", "slewing+travelling", and "others". Although in FIG. 12, illustration of a bar chart for the operation state of "others" is omitted, a bar chart for the operation state of "others" may be displayed. In each graph of the chart by time zone 202, the abscissa represents time and the ordinate represents the number of times of obstacle sensing.

Additionally, in each bar chart of the chart by time zone 202, a bar indicating the number of times is displayed in the same color in color-coding as that of the chart by reaction direction and region 201. For example, in the bar chart of "slewing", a bar of a time zone between 8 and 9 is configured by yellow with the first density indicating that the number of times of sensing in the stop region 310L in the left direction is once, and yellow with the second density lower than the first density and indicating that the number of times of sensing in the deceleration region 311L in the left direction is once.

Thus, since in the chart by reaction direction and region 201 and the chart by time zone 202, the same color is used in the same region, it is easy to grasp a corresponding relationship between the charts.

Here, at the time of generating the chart by time zone 202, the control unit 51 classifies log data of a target construction machine according to kinds of the operation state information stored in the field of "operation". Then, the control unit 51 classifies the log data, which is classified according to kinds of the operation state information, by one hour using the time information stored in the field of "occurrence time" to calculate the number of times of occurrence per hour in each obstacle sensing operation state from the number of pieces of log data in each classification. Then, the control unit 51 calculates a breakdown of the calculated number of times of occurrence based on the sensor reaction direction information and the region information, and displays one bar in color-coding according to the calculated breakdown.

The detailed table 203 is a table in which the content of the log data table TB1 shown in FIG. 9 is displayed. The detailed table 203 is used when further detailed information is required. Therefore, the detailed daily report DR2 may not include the detailed table 203. In such a case, the control unit 51 only needs to cause the detailed table 203 to be displayed when actually required.

Here, the control unit 51 only needs to extract log data of a relevant construction machine from among the log data received from the server 60 to generate the detailed table 203.

Here, in the overall daily report DR1 (FIG. 11), in a case where a plurality of icons (e.g. the icons R1 to R3 in FIG. 11) are displayed for one construction machine, when any one of the icons is selected, the control unit 51 collectively generates the detailed daily reports DR2 of the construction machines at a plurality of positions corresponding to the selected icon irrespective of a position of the selected icon. This is, however, only one example, and the control unit 51 may generate the detailed daily report DR2 of only the position of the selected icon.

As described in the foregoing, the hydraulic excavator 1 of the present embodiment accumulatively stores approach information (log data) indicating that an obstacle has been sensed by any of the left side sensor 31L, the right side sensor 31R, and the rear side sensor 31B for one day, and outputs the approach information to the network NW to cause the display unit 54 to display the approach information. This allows those concerned to check the displayed approach information and an operator to check a condition at that time. Then, the checking serves for safety of subsequent work.

The hydraulic excavator 1 according to the present embodiment outputs occurrence time when an obstacle has been sensed so as to be included in approach information. It is therefore possible to allow those concerned to check information about at which time obstacle approach has occurred.

According to the hydraulic excavator 1 of the present embodiment, log data includes region information indicating in which of the stop region 310 and the deceleration region 311, an obstacle has been sensed. It is therefore possible to allow those concerned to check information about to which extent an obstacle has approached the hydraulic excavator 1.

Having log data included in position information, the hydraulic excavator 1 of the present embodiment enables those concerned to check a position at which obstacle approach to a construction machine has occurred.

In the overall daily report DR1 according to the present embodiment, based on log data output from the hydraulic excavator 1, the icons R1 to R3, Y1, and B1 to B3 are displayed on a map image in a manner of allowing a construction machine in which an obstacle has been sensed and the number of times of obstacle sensing to be visually identified. It is therefore possible to allow those concerned to check, on a map image, information about at which position, which construction machine, and how many times an obstacle approached to the construction machine.

According to the hydraulic excavator 1 of the present embodiment, in the chart by reaction direction and region 201 shown in FIG. 12, the number of times of obstacle sensing per day is displayed for each sensor reaction direction together with the construction machine image 210. The hydraulic excavator 1 therefore allows those concerned to visually check information about in which direction obstacle approach to a construction machine has occurred.

According to the hydraulic excavator 1 of the present embodiment, in the chart by time zone 202 shown in FIG. 12, bar charts indicative of the number of times of obstacle sensing on a time zone basis are displayed. The hydraulic excavator 1 therefore allows those concerned to visually check information about in which time zone and how many times obstacle approach has occurred.

The obstacle monitoring system according to the present invention is not limited to the above-described embodiment and can be variously modified or improved within a range of claims.

Figure 13:
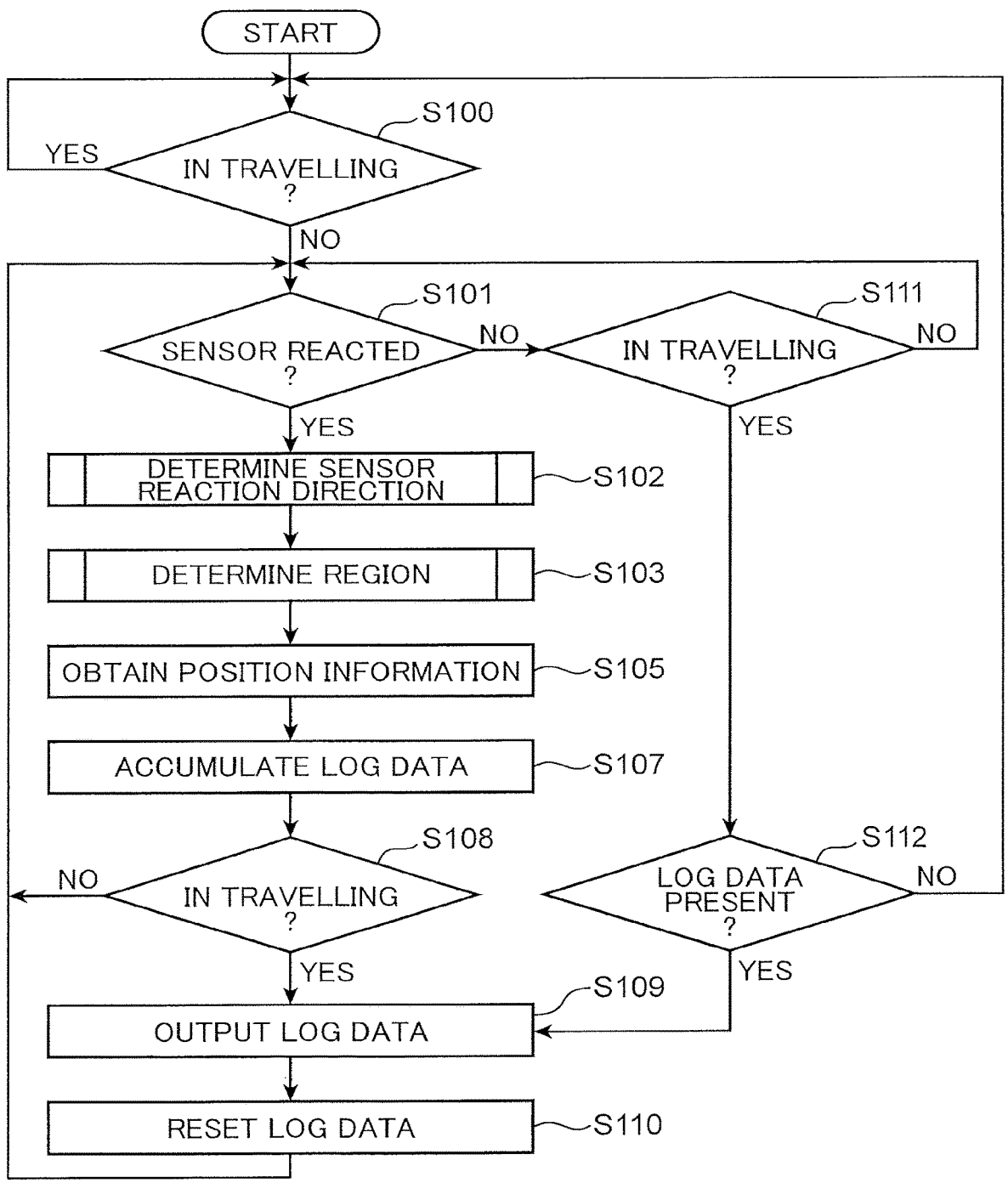
FIG. 13 is a flow chart showing log data recording processing in a modification example.

(1) Log data recording processing according to a modification example will be described with reference to FIG. 13. FIG. 13 is a flow chart showing the log data recording processing in a modification example. The modification example in FIG. 13 causes the storage unit 42 to store log data in a case where the hydraulic excavator 1 is not travelling based on a signal from the operation lever 38, and output the log data stored in the storage unit 42 when the hydraulic excavator 1 is brought into a travelling state.

When the log data recording processing shown in FIG. 13 starts, the storage processing unit 412 determines from a state of the travelling operation lever 381 sensed by the operation state sensing unit 35 whether the hydraulic excavator 1 is travelling (S100). Here, when it is sensed by the operation state sensing unit 35 that the travelling operation lever 381 slants exceeding a neutral range, the storage processing unit 412 may determine that the hydraulic excavator 1 is travelling, and when it is sensed by the operation state sensing unit 35 that the travelling operation lever 381 is within the neutral range, determine that the hydraulic excavator 1 is not travelling. When in S100, determination is made that the hydraulic excavator 1 is travelling (S100: YES), the processing of S100 is repeated.

On the other hand, when the hydraulic excavator 1 stops travelling and the hydraulic excavator 1 is not in the travelling state (S100: NO), the processing proceeds to S101. Since the processing of S101, S102, S103, and S105 is the same as that of S1, S2, S3, and S5 of FIG. 5, no description will be made thereof. In S107, the storage processing unit 412 generates log data indicating in which of the left side sensor 31L, the right side sensor 31R, and the rear side sensor 31B, an obstacle has been sensed and causes the storage unit 42 to store the log data.

Next, the storage processing unit 412 again determines from the state of the travelling operation lever 381 sensed by the operation state sensing unit 35 whether the hydraulic excavator 1 is travelling (S108). When the hydraulic excavator 1 is not travelling (S108: NO), the storage processing unit 412 returns the processing to S101. On the other hand, when in S101, none of the left side sensor 31L, the right side sensor 31R, and the rear side sensor 31B reacts (S101: NO), the processing proceeds to S111. When in S111, the hydraulic excavator 1 is not travelling (S111: NO), the processing returns to S101. On the other hand, when in S111, the hydraulic excavator 1 is brought into the travelling state (S111: YES), the processing proceeds to S112.

In other words, while a loop of S101: NO and S111: NO continues, the hydraulic excavator 1 is not travelling and is therefore in a state of waiting for any of the left side sensor 31L, the right side sensor 31R, and the rear side sensor 31B to react. Then, when any of the sensors reacts during waiting, determination is made to be YES in S101, so that the processing proceeds to S102, and log data is stored in the storage unit 42 through the processing of S103, S105, and S107.

Thus, the storage processing unit 412 sets a period when the hydraulic excavator 1 is not travelling as a specific period, and when an obstacle is sensed by a sensor in the specific period, repeats processing of generating log data indicating the sensing and of causing the storage unit 42 to store the log data.

When in S108, the hydraulic excavator 1 is brought into the travelling state (S108: YES), the output processing unit 413 outputs the log data stored in the storage unit 42 (S109). Next, the output processing unit 413 erases the log data stored in the storage unit 42 to reset the storage unit 42 (S110).

On the other hand, when the hydraulic excavator 1 is brought into the travelling state (S111: YES) while the storage processing unit 412 waits for a sensor to react (S101: NO and S111: NO), the output processing unit 413 determines whether log data is stored in the storage unit 42 (S112). When determining that log data is stored in the storage unit 42 (S112: YES), the output processing unit 413 outputs the log data stored in the storage unit 42 (S109). On the other hand, when the log data is not stored in the storage unit 42 (S112: NO), the processing returns to S100. In this case, the storage processing unit 412 waits for processing until the hydraulic excavator 1 stops travelling.

While in the modification example of FIG. 13, log data when the hydraulic excavator 1 is not travelling is accumulated and the accumulated log data is output when the hydraulic excavator is brought into the travelling state, this is only one example. In the present invention, log data when the hydraulic excavator 1 is travelling may be accumulated, and the accumulated log data may be output when the hydraulic excavator is brought into the non-travelling state. In this case, a period when the hydraulic excavator is travelling is set as a specific period.

Alternatively, when the hydraulic excavator 1 is not travelling and not slewing, i.e., when the hydraulic excavator 1 is in an idling state, for example, log data may be accumulated and when the idling state is released, the accumulated log data may be output. In this case, a period in which the hydraulic excavator 1 is in the idling state is considered as a specific period. Accumulating log data in the idling state and outputting the log data enables acquisition of information about movement of a person passing around the hydraulic excavator 1 that is not moving. Additionally, in this mode, the control unit 4 may be provided with a counter so that the counter can count the number of times of obstacle sensing.

The hydraulic excavator according to the present modification example outputs log data stored in the storage unit 42 during a predetermined operation state. Thus, the present modification example enables those concerned to check information about in which operation state and how many times an obstacle has approached.

(2) While in the above-described embodiment, in S3 of FIG. 5, the storage processing unit 412 executes the processing of determining in which one of the stop region 310 or the deceleration region 311 an obstacle is located, the determination processing can be omitted.

Additionally, while in S4, the storage processing unit 412 determines a state of the hydraulic excavator 1 from a state of the operation lever 38 sensed by the operation state sensing unit 35, the processing can be omitted. When the left side sensor 31L or the right side sensor 31R reacts, it is highly probable that the hydraulic excavator 1 is conducting the slewing operation and when the rear side sensor 31B reacts, it is highly probable that the hydraulic excavator 1 is conducting retreat travelling operation. Therefore, when the left side sensor 31L or the right side sensor 31R reacts, the storage processing unit 412 only needs to assume that the hydraulic excavator 1 is in the slewing state and when the rear side sensor 31B reacts, assume that the hydraulic excavator 1 is in the travelling state.

Additionally, while in S5, the storage processing unit 412 executes the processing of obtaining position information, the processing can be omitted. In this case, the GPS reception unit 37 is not required. Further, while in S6, the storage processing unit 412 executes the processing of obtaining present time, the processing can be omitted. In this case, the timing unit 43 is not required. However, when the timing unit 43 is not provided, the storage processing unit 412 is not allowed to determine whether the present time comes to 0. In this case, the output processing unit 413 only needs to, for example, output log data stored in the storage unit 42 when the operation of turning off power of the control unit 4 is input and thereafter, turn off the power of the control unit 4.

(3) Although in the above-described embodiment, log data accumulated in the log data table TB1 is output to the server 60, and displayed on the display unit 54 of the information processing device 50, or printed on a paper by the printer 56, this is not always the case. For example, the hydraulic excavator 1 may display the data accumulated in the log data table TB1 on the display unit 6 provided in the driver's cab 7X of the hydraulic excavator 1. In this case, an operator himself/herself who has driven can check the log data or another operator can check the log data to share obstacle information, thereby serving for safety.

(4) While in the above-described embodiment, the log data accumulated in the log data table TB1 is output from the communication unit 7, this is not always the case. For example, the log data accumulated in the log data table TB1 can be recorded in a storage medium such as a USB memory using a USB interface or the like. Then, the information processing device 50 only needs to read the log data recorded in the recording medium from the recording medium.

(5) While in the above-described embodiment, the three obstacle sensing sensors, i.e., the left side sensor 31L, the right side sensor 31R, and the rear side sensor 31B are provided, the number of obstacle sensing sensors or a position where the sensor is disposed are not limited thereto. For example, the hydraulic excavator 1 may include two right and left rear side sensors 31B. Additionally, while the shape shown in FIG. 4 is adopted as a shape of the monitoring region 300 set around the hydraulic excavator 1, the present invention is not limited thereto, and a shape other than the shape shown in FIG. 4 may be adopted. For example, the monitoring region 300 may have a shape surrounding the entire region of the left side surface 3L, the entire region of the right side surface 3R, and the entire region of the rear side surface 3B.

(6) While in the above-described embodiment, the log data recording processing is executed all the time, i.e., safety function is on, when the hydraulic excavator 1 is operated (e.g. when power of the control unit 4 is on). However, when it is known that workers frequently pass around the hydraulic excavator 1, it will be complicated to store all the log data. Under these circumstances, the hydraulic excavator 1 may be configured to be able to temporarily turn off the safety function. For example, the processing unit 41 may turn off the safety function upon accepting an instruction to turn off the safety function from an operator. Alternatively, the hydraulic excavator 1 may turn off the safety function when the left side sensor 31L, the right side sensor 31R, and the rear side sensor 31B detect more than the predetermined number of persons per unit time.

(7) In the above-described embodiment, in the sensor reaction direction determination processing shown in FIG. 6, a sensor having reacted is alternatively determined among the left side sensor 31L, the right side sensor 31R, and the rear side sensor 31B. However, when a plurality of persons simultaneously approach the hydraulic excavator 1, for example, when one person approaches the left side surface 3L and another person approaches the rear side surface 3B, the plurality of sensors might simultaneously react. In this case, in the sensor reaction direction determination processing, the storage processing unit 412 simultaneously determines a plurality of sensor reaction directions, such as "the sensor reaction direction"="left" and "rear". Then, with respect to each sensor reaction direction, the storage processing unit 412 may individually determine in which one of the stop region 310 and the deceleration region 311 an obstacle is present (S3), and may cause the storage unit 42 to accumulatively store log data corresponding to each sensor reaction direction (S7). Specifically, when two sensors simultaneously react, the storage processing unit 412 may cause the storage unit 42 to accumulatively store two log data.

(8) Although in the above-described embodiment, when sensing an obstacle, a person and an object other than a person are not distinguished, the storage processing unit 412 may generate log data while distinguishing a person and an object other than a person, and cause the storage unit 42 to store the log data. As methods of distinguishing a person and an object other than a person, for example, a method of detecting a temperature of an obstacle by an infrared camera and a method of discriminating a shape of a person by image processing can be adopted. By distinguishably detecting a person and an object other than a person, more detailed information for analysis can be obtained.

(9) In the overall daily report DR1 of the above-described embodiment, construction machines having the same identification number are displayed in icons of the same color so that construction machines can be identified. Specifically, with reference to FIG. 11, three construction machines are displayed using the red icons R1 to R3, the yellow icon Y1, and the blue icons B1 to B3. However, a construction machine identification method is not limited thereto. For example, a mode can be adopted in which a plurality of icons, corresponding to the same construction machine, are linked by lines without color-coding.

(10) In the overall daily report DR1 of the above-described embodiment, the number of times of occurrence of obstacle sensing is indicated by a size of a circle of an icon. However, a method of indicating the number of times of occurrence of obstacle sensing is not limited thereto. For example, the number of times of occurrence may be indicated by a density of a color of an icon without changing the size of the circle of the icon. For example, a mode may be adopted in which when the number of times of occurrence is 0 to 1, an icon is displayed in red with a first density, when the number of times of occurrence is 2 to 3, the icon is displayed in red with a second density higher than the first density, and when the number of times of occurrence is 4 or more, the icon is displayed in red with a third density higher than the second density.

(11) Although the above-described embodiment adopts a mode of displaying the overall daily report DR1 and the detailed daily report DR2, a mode of displaying a report periodically summarizing log data on the display unit 54 may be adopted. For example, a mode of displaying a report showing the number of times of occurrence of obstacle sensing in a graph on a month basis may be adopted.

(12) While the above-described embodiment adopts one day as a fixed period and adopts a mode of outputting log data on a day basis, the fixed period is not limited to one day. Other period, for example, one hour, one week, or the like can be adopted as a fixed period.

(13) While the above-described embodiment adopts the hydraulic excavator 1 having the upper stewing body 3 and the lower travelling body 2 as one example of a construction machine, the present invention is applicable also to a construction machine that is not slewable. In this case, the left side sensor 31L, the right side sensor 31R, and the rear side sensor 31B only need to be disposed in the machine main body.

(14) While the above-described embodiment adopts a mode in which the hydraulic excavator 1 transmits log data to the server 60 to cause the server 60 to accumulate the log data, and the information processing device 50 obtains log data from the server 60, this is only one example. In the present invention, the information processing device 50 may obtain log data by direct communication with the hydraulic excavator 1. In this ease, the information processing device 50 is communicably connected with one or a plurality of construction equipments including the hydraulic excavator 1 to be managed via the network NW in advance so as to obtain log data from these construction machines. In this case, the log data table TB2 shown in FIG. 10 is stored not in the server 60 but in the information processing device 50. Additionally, in this case, the server 60 may be omitted from the obstacle monitoring system shown in FIG. 3.

CONCLUSION

The above-described features of the embodiment are summarized as follows.

(1) An obstacle monitoring system according to one aspect of the present invention is an obstacle monitoring system including:
  one or a plurality of construction machines;
  a server; and
  an information processing device,
  the construction machines, the server, and the information processing device being connected via a network, in which
  each of the construction machines includes:
    a machine main body;
    a monitoring region setting unit which sets a monitoring region around the machine main body, the monitoring region being for monitoring entry of an obstacle;
    a plurality of obstacle sensing sensors arranged in the machine main body for sensing an obstacle entering the monitoring region from different directions;
    a storage unit;
    a storage processing unit which generates, when the obstacle has been sensed by at least one of the plurality of obstacle sensing sensors in a specific period, approach information indicating that the obstacle has been sensed to cause the storage unit to accumulatively store the approach information; and
    an output processing unit which outputs the approach information accumulatively stored in the storage unit in the specific period,
  wherein the server includes a log data storage unit which stores the approach information output from each of the construction machines, and
  wherein the information processing device includes:

a communication unit which obtains the approach information from the server; and a control unit which displays the obtained approach information on a display.

According to the above-described configuration, when an obstacle is sensed by any of the plurality of obstacle sensing sensors in a fixed period or a specific period, approach information indicating that an obstacle has been sensed is accumulatively stored in the storage unit and displayed on the display of the display device. This enables those concerned to check displayed approach information and grasp a cause of entry of an obstacle into the monitoring region by asking an operator of a construction machine for a site condition or the like. As a result, the present aspect enables presentation of information useful for safety of subsequent work to those concerned.

(2) Preferably, the above-described aspect further includes a time information obtaining unit which obtains a time at which the obstacle has been sensed as time information, in which the specific period is a predetermined fixed period, the storage processing unit accumulatively stores the approach information including the time information in the storage unit in the specific period based on the time information obtained by the time information obtaining unit, and the output processing unit outputs the approach information including the time information.

This configuration enables those concerned to check time when an obstacle has entered the monitoring region because approach information includes time information indicating time when an obstacle has been sensed.

(3) Preferably in the above-described aspect, the machine main body includes a lower travelling body, and an upper slewing body arranged on an upper side of the lower travelling body so as to be slewable with respect to the lower travelling body, the construction machine further includes an operation state information obtaining unit which obtains operation state information indicating operation states including a travelling state caused by operation of the lower travelling body and a slowing state of the upper slewing body with respect to the lower travelling body, the storage processing unit determines whether the construction machine is in a predetermined operation state based on the obtained operation state information, and, when determining that the construction machine is in the predetermined operation state, sets a duration of the predetermined operation state as the specific period and accumulatively stores the approach information, and the output processing unit outputs the accumulatively stored approach information in a period of the predetermined operation state.

This configuration enables those concerned to check information about in which operation state and how many times obstacle approach has occurred because the approach information stored in the storage unit is output while the construction machine is in a predetermined operation state.

(4) Preferably in the above-described aspect, the monitoring region setting unit sets, as the monitoring region, a first region which is a region provided in proximity to the machine main body, the first region being for conducting predetermined control for the construction machine when the obstacle has entered the first region, and a second region which is a region provided outside the first region, the second region being for conducting another control different from the predetermined control for the construction machine when the obstacle has entered the second region, the storage processing unit makes the approach information include region information indicating in which region of the first region and the second region the obstacle has been sensed, and the output processing unit outputs the approach information including the region information.

This configuration enables those concerned to check information about to which extent an obstacle approached a construction machine because region information is included in the approach information, the region information indicating in which one of the first region near the construction machine and the second region outside the first region an obstacle has been sensed.

(5) Preferably, the above-described aspect further includes a position information obtaining unit which obtains position information indicating a position of the construction machine, the storage processing unit makes the approach information include the position information when the obstacle has been sensed, and the output processing unit outputs the approach information including the position information.

This configuration enables those concerned to check a position at which an obstacle approach has occurred because the position information of the construction machine is output.

(6) Preferably in the above-described aspect, the storage processing unit further makes the approach information include identification information which identifies own machine, the output processing unit outputs the approach information including the position information and the identification information, and the control unit generates one or a plurality of construction machine images indicating, with respect to each position at which an obstacle has been sensed, each of one or a plurality of construction machines in which the obstacle has been sensed based on the identification information and the position information included in the approach information, the one or the plurality of construction machine images visually showing the number of times of obstacle sensing on a position basis, superposes the generated one or plurality of construction machine images on a map image to generate a first report image, and displays the first report image on the display.

According to this configuration, the first report image displayed on a map image is displayed on the display in a display mode in which one or a plurality of construction machine images visually show the number of times of obstacle sensing, the one or plurality of construction machine images indicating each of one or a plurality of construction machines in which an obstacle has been sensed on a position basis.

This enables those concerned to check a position of each construction machine in which obstacle approach has been sensed and the number of times of obstacle approach has been sensed at the position. Additionally, since the construction machine image is displayed on the map image, it is possible to allow those concerned to easily grasp a position at which obstacle approach has been sensed.

(7) Preferably in the above-described aspect, the storage processing unit determines, based on an arrangement position of the obstacle sensing sensor having reacted to the obstacle, a direction in which the obstacle entered the monitoring region as a sensor reaction direction, and makes the approach information include sensor reaction direction information indicative of the sensor reaction direction, and the control unit generates a second report image displaying, for each of the sensor reaction directions, the number of times of sensing of the obstacle together with a construction machine image indicative of the construction machine based on sensor reaction information included in the approach information output from the construction machine in the specific period, and displays the second report image on the display.

This configuration enables those concerned to visually check a direction and the number of times an obstacle approached a construction machine because the second report image is displayed which indicates the number of times when an obstacle has been sensed on a sensor reaction direction basis together with a construction machine image.

(8) Preferably in the above-described aspect, the storage processing unit makes the approach information include time information indicating time when the obstacle has been sensed, and the control unit generates a third report image displaying the number of times of obstacle sensing on a time zone basis based on the time information included in the approach information, and displays the third report image on the display.

This configuration enables those concerned to visually check information about in which time zone and how many times obstacle approach has occurred because the third report image is displayed, the third report image indicating the number of times of obstacle sensing on a time zone basis.

(9) Preferably in the above-described aspect, the plurality of obstacle sensing sensors include a side sensor provided on a side of the machine main body and a rear side sensor provided in a rear of the machine main body.

In this configuration, the plurality of obstacle sensing sensors include the side sensor provided on the side of the machine main body and the rear side sensor provided in the rear of the machine main body. In this case, when the side sensor reacts, it can be assumed that it is highly probably slewing operation and when the rear side sensor reacts, it can be assumed that it is highly probably retreat travelling operation. Accordingly, the present aspect makes it possible to assume in which operation state obstacle approach has occurred by not necessarily obtaining a signal indicative of an operation state.

(10) Preferably in the above-described aspect, the one or plurality of construction machine images are icons indicative of a construction machine, the icons having a larger size as the number of times of obstacle sensing at each sensing position increases.

This aspect enables those concerned to visually grasp the number of times of obstacle sensing because the number of times of obstacle sensing is shown by a size of an icon.

(11) Preferably in the above-described aspect, the storage processing unit, based on an arrangement position of the obstacle sensing sensor having reacted to the obstacle, determines a direction in which the obstacle entered the monitoring region as a sensor reaction direction, and makes the approach information sensor reaction direction information indicative of the sensor reaction direction, and when sensing operation of selecting an icon indicative of any one construction machine image among the one or plurality of construction machine images in the first report image, the control unit generates a second report image displaying, for each sensor reaction direction, the number of times of sensing of the obstacle together with the construction machine image based on sensor reaction information included in the approach information output from the construction machine in the specific period, and generates a third report image displaying the number of times of sensing of an obstacle on a time zone basis based on time information included in the approach information output from the construction machine in the specific period, thereby displaying the second report image and the third report image side by side on the display.

According to the present aspect, when an icon indicative of one construction machine is selected in the first report image, the second report image and the third report image are displayed side by side on the display. The present aspect therefore enables those concerned to collate the number of times of obstacle sensing in a selected construction machine in each sensor reaction direction and the number of times of sensing with the lapse of time.

(12) Preferably in the above-described aspect, the control unit generates the second report image in which a monitoring region image indicative of the monitoring region is displayed around the construction machine image, the monitoring region image being divided into a plurality of divided regions corresponding to the sensor reaction directions, and the number of times of obstacle sensing in each of the sensor reaction directions being displayed in a corresponding divided region.

This configuration enables visual recognition of the number of times of obstacle sensing in each divided region because the number of times of obstacle sensing is displayed in the divided region which is obtained by dividing the monitoring region image indicative of a monitoring region according to a sensor reaction direction.

The present invention may be configured by the above-described construction machine alone, or may be realized as an obstacle monitoring method by an obstacle monitoring system, or may be realized as a program which causes a computer to execute the obstacle monitoring method, or may be realized as a computer-readable recording medium which records the program.

INDUSTRIAL APPLICABILITY

As described in the foregoing, the obstacle monitoring system according to the present invention is applicable to a hydraulic excavator which stores information about an obstacle approaching the surroundings of a machine, or the like.

This application is based on Japanese Patent application No. 2017-036271 filed in Japan Patent Office on Feb. 28, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:
1. An obstacle monitoring system comprising:
one or a plurality of construction machines;
a server; and
an information processing device,
the construction machines, the server, and the information processing device being connected via a network,
wherein each of the construction machines includes:
a machine main body;

a monitoring region setting unit which sets a monitoring region around the machine main body, the monitoring region being for monitoring entry of an obstacle;

a plurality of obstacle sensing sensors arranged in the machine main body for sensing an obstacle entering the monitoring region from different directions;

a storage unit;

a storage processing unit which generates, when the obstacle has been sensed by at least one of the plurality of obstacle sensing sensors in a specific period, approach information indicating that the obstacle has been sensed to cause the storage unit to accumulatively store the approach information; and an output processing unit which outputs the approach information accumulatively stored in the storage unit in the specific period, wherein the server includes a log data storage unit which stores the approach information output from each of the construction machines, and wherein the information processing device includes:
a communication unit which obtains the approach information from the server; and
a control unit which displays the obtained approach information on a display.

2. The obstacle monitoring system according to claim 1, further comprising a time information obtaining unit which obtains a time at which the obstacle has been sensed as time information, wherein the specific period is a predetermined fixed period, the storage processing unit accumulatively stores the approach information including the time information in the storage unit in the specific period based on the time information obtained by the time information obtaining unit, and the output processing unit outputs the approach information including the time information.

3. The obstacle monitoring system according to claim 1, wherein the machine main body includes a lower travelling body, and an upper slewing body arranged on an upper side of the lower travelling body so as to be slewable with respect to the lower travelling body, the construction machine further includes an operation state information obtaining unit which obtains operation state information indicating operation states including a travelling state caused by operation of the lower travelling body and a slewing state of the upper slewing body with respect to the lower travelling body, the storage processing unit determines whether the construction machine is in a predetermined operation state based on the obtained operation state information, and, when determining that the construction machine is in the predetermined operation state, sets a duration of the predetermined operation state as the specific period and accumulatively stores the approach information, and the output processing unit outputs the accumulatively stored approach information in a period of the predetermined operation state.

4. The obstacle monitoring system according to claim 1, wherein the monitoring region setting unit sets, as the monitoring region, a first region which is a region provided in proximity to the machine main body, the first region being for conducting predetermined control for the construction machine when the obstacle has entered the first region, and a second region which is a region provided outside the first region, the second region being for conducting another control different from the predetermined control for the construction machine when the obstacle has entered the second region, the storage processing unit makes the approach information include region information indicating in which region of the first region and the second region the obstacle has been sensed, and the output processing unit outputs the approach information including the region information.

5. The obstacle monitoring system according to claim 1, wherein each of the construction machines further includes a position information obtaining unit which obtains position information indicating a position of the construction machine, the storage processing unit makes the approach information include the position information when the obstacle has been sensed, and the output processing unit outputs the approach information including the position information.

6. The obstacle monitoring system according to claim 5, wherein the storage processing unit further makes the approach information include identification information which identifies own machine, the output processing unit outputs the approach information including the position information and the identification information, and the control unit generates one or a plurality of construction machine images indicating, with respect to each position at which an obstacle has been sensed, each of one or a plurality of construction machines in which the obstacle has been sensed based on the identification information and the position information included in the approach information, the one or the plurality of construction machine images visually showing the number of times of obstacle sensing on a position basis, superposes the generated one or plurality of construction machine images on a map image to generate a first report image, and displays the first report image on the display.

7. The obstacle monitoring system according to claim 1, wherein the storage processing unit determines, based on an arrangement position of the obstacle sensing sensor having reacted to the obstacle, a direction in which the obstacle entered the monitoring region as a sensor reaction direction, and makes the approach information include sensor reaction direction information indicative of the sensor reaction direction, and the control unit generates a second report image displaying, for each of the sensor reaction directions, the number of times of sensing of the obstacle together with a construction machine image indicative of the construction machine based on sensor reaction information included in the approach information output from the construction machine in the specific period, and displays the second report image on the display.

8. The obstacle monitoring system according to claim 2, wherein the storage processing unit makes the approach information include time information indicating time when the obstacle has been sensed, and the control unit generates a third report image displaying the number of times of obstacle sensing on a time zone basis based on the time information included in the approach information, and displays the third report image on the display.

9. The obstacle monitoring system according to claim 1, wherein
the plurality of obstacle sensing sensors include a side sensor provided on a side of the machine main body and a rear side sensor provided in a rear of the machine main body.

10. The obstacle monitoring system according to claim 6, wherein
the one or plurality of construction machine images are icons indicative of a construction machine, the icons having a larger size as the number of times of obstacle sensing at each sensing position increases.

11. The obstacle monitoring system according to claim 10, wherein
the storage processing unit determines, based on an arrangement position of the obstacle sensing sensor having reacted to the obstacle, a direction in which the obstacle entered the monitoring region as a sensor reaction direction, and makes the approach information sensor reaction direction information indicative of the sensor reaction direction, and
when sensing operation of selecting an icon indicative of any one construction machine image among the one or plurality of construction machine images in the first report image, the control unit generates a second report image displaying, for each sensor reaction direction, the number of times of sensing of the obstacle together with the construction machine image based on sensor reaction information included in the approach information output from the construction machine in the specific period, and generates a third report image displaying the number of times of sensing of an obstacle on a time zone basis based on time information included in the approach information output from the construction machine in the specific period, thereby displaying the second report image and the third report image side by side on the display.

12. The obstacle monitoring system according to claim 11, wherein
the control unit generates the second report image in which a monitoring region image indicative of the monitoring region is displayed around the construction machine image, the monitoring region image being divided into a plurality of divided regions corresponding to the sensor reaction directions, and the number of times of obstacle sensing in each of the sensor reaction directions being displayed in a corresponding divided region.

13. A construction machine comprising:
a machine main body;
a monitoring region setting unit which sets a monitoring region around the machine main body, the region being for monitoring entry of an obstacle;
a plurality of obstacle sensing sensors arranged in the machine main body for sensing an obstacle entering the monitoring region from different directions;
a storage unit;
a storage processing unit which generates, when the obstacle has been sensed by at least one of the plurality of obstacle sensing sensors in a specific period, approach information indicating that the obstacle has been sensed to cause the storage unit to accumulatively store the approach information; and
an output processing unit which outputs the approach information accumulatively stored in the storage unit in the specific period to display the approach information on a display device.

14. An obstacle monitoring method in an obstacle monitoring system including one or a plurality of construction machines, a server, and an information processing device connected via a network,
each of the construction machines including a plurality of obstacle sensing sensors for sensing an obstacle entering a monitoring region set around a machine main body for monitoring entry of an obstacle from different directions,
the method comprising:
causing each of the construction machines to
set the monitoring region around the construction machine,
generate, when the obstacle has been sensed by at least one of the plurality of obstacle sensing sensors in a specific period, approach information indicating that the obstacle has been sensed to cause the storage unit to accumulatively store the approach information, and
output the approach information accumulatively stored in the storage unit in the specific period;
causing the server to include the approach information output from each construction machine in a log data storage unit; and
causing the information processing device to obtain the approach information from the server and display the obtained approach information on a display.

* * * * *